United States Patent
Liu et al.

(10) Patent No.: US 12,081,299 B2
(45) Date of Patent: Sep. 3, 2024

(54) CHANNEL STATE INFORMATION REPORTING METHOD AND DEVICE

(71) Applicant: DATANG MOBILE COMMUNICATIONS EQUIPMENT CO., LTD., Beijing (CN)

(72) Inventors: Zhengxuan Liu, Beijing (CN); Hui Li, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 337 days.

(21) Appl. No.: 17/441,677

(22) PCT Filed: Dec. 24, 2019

(86) PCT No.: PCT/CN2019/128026
§ 371 (c)(1),
(2) Date: Sep. 21, 2021

(87) PCT Pub. No.: WO2020/186871
PCT Pub. Date: Sep. 24, 2020

(65) Prior Publication Data
US 2022/0149909 A1    May 12, 2022

(30) Foreign Application Priority Data
Mar. 21, 2019  (CN) .......................... 201910215992.2

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0658* (2013.01)

(58) Field of Classification Search
CPC combination set(s) only.
See application file for complete search history.

(56) References Cited

U.S. PATENT DOCUMENTS

2019/0052335 A1    2/2019  Rahman et al.

FOREIGN PATENT DOCUMENTS

| CN | 106685490 A | 5/2017 |
|---|---|---|
| CN | 108288983 A | 7/2018 |

(Continued)

OTHER PUBLICATIONS

Samsung, "CSI enhancement for MU-MIMO", Jan. 2019, 3GPP TSG RAN WG1 AH-1901 Taipei, Taiwan R1-1901276 (Year: 2019).*

(Continued)

*Primary Examiner* — Siming Liu
(74) *Attorney, Agent, or Firm* — Kilpatrick Townsend & Stockton LLP

(57) ABSTRACT

Disclosed are a channel state information reporting method and device, relating to the field of wireless communications and used for solving the problem of no corresponding CSI reporting method being provided at present regarding a Rel-16 codebook structure. The method of the present application includes a terminal determining, according to codebook parameter information, codebook indication information corresponding to a data transmission layer; and the terminal sending channel state information (CSI) including the codebook indication information to a network side device, and the codebook indication information includes a part or all of the following: beam information for determining a precoding matrix orthogonal combination beam, base vector information for determining a precoding matrix com- (Continued)

pression base vector, and nonzero coefficient indication information for determining a precoding matrix compression coefficient.

13 Claims, 9 Drawing Sheets

(56) References Cited

FOREIGN PATENT DOCUMENTS

| CN | 109075849 A | 12/2018 |
|---|---|---|
| CN | 109150270 A | 1/2019 |
| CN | 109219935 A | 1/2019 |
| CN | 109314599 A | 2/2019 |
| WO | 2017166219 A1 | 10/2017 |

OTHER PUBLICATIONS

ZTE, "CSI Enhancement for MU-MIMO Support", Mar. 1, 2019, 3GPP TSG RAN WG1 Meeting #96 Athens, Greece R1-1903343 (Year: 2019).*

Catt, Discussions on Type II CSI enhancement, Mar. 1, 2019, 3GPP TSG RAN WG1 Meeting #96 Athens, Greece R1-102018 (Year: 2019).*

Vivo, "Discussion on CSI reporting", 3GPP TSG RAN WG1 Meeting #90bis, Prague, CZ, Oct. 9-13, 2017, total 5 pages, R1-1717471.

Huawei et al., "Discussion on CSI enhancement", 3GPP TSG RAN WGI Meeting #95, Spokane, USA, Nov. 12-16, 2018, total 8 pages, R1-1812242.

ZTE,"CSI Enhancement for MU-MI MO Support", 3GPP TSG RAN WG1 Meeting #96, Athens, Greece, Feb. 25-Mar. 1, 2019, total 16 pages, R1-1903343.

Nokia et al., "CSI Enhancements for MU-MIMO", 3GPP TSG RAN WG1 Ad-Hoc Meeting #AH1901, Taipei, Taiwan, Jan. 21-25, 2019, total 17 pages, R1-1900690.

Huawei et al., "Discussion on CSI enhancement", 3GPP TSG RAN WG1 Meeting #96,Athens, Greece, Feb. 25-Mar. 1, 2019, total 17 pages, R1-1901566.

Catt, "Discussions on Type II CSI enhancement", 3GPP TSG RAN WG1 Meeting #96, Athens, Greece, Feb. 25-Mar. 1, 2019, total 16 pages, R1-1902018.

* cited by examiner

| RI | Broadband CQI-1 | Differential CQI-1 | The quantity of zero coefficients of layer 1 | The quantity of zero coefficients of layer 2 |

FIG. 1A

| Rotation factor | Beam indication | Strongest beam indication -1 | Wideband amplitude coefficient -1 | Strongest beam indication -2 | Wideband amplitude coefficient -2 | Subband amplitude /phase for even-numbered subband | Subband amplitude /phase for odd-numbered subband |

FIG. 1B

FIG. 2

| 1 | 0 | 1 | 0 | 0 | 0 | 0 | 1 | 0 | 0 | 0 | 1 | 0 | 0 | 0 | 0 |

FIG. 3

| 0 | 1 | 0 | 0 | 0 | 1 | 1 | 0 | 0 | 0 | 0 | 0 | 1 | 0 | 0 | 0 |

FIG. 4

| 1 | 0 | 0 | 1 | 0 | 0 | 0 | 1 | 0 | 0 | 0 | 1 | 0 |

FIG. 5

| 1 | 0 | 0 | 0 | 1 | 0 | 0 | 0 | 0 | 0 | 0 | 0 | 0 |

FIG. 6

| 1 | 1 | 0 | 0 |
|---|---|---|---|
| 1 | 1 | 1 | 1 |
| 0 | 1 | 0 | 0 |
| 0 | 0 | 1 | 0 |
| 1 | 0 | 1 | 1 |
| 1 | 0 | 0 | 0 |
| 1 | 1 | 1 | 1 |
| 0 | 0 | 0 | 0 |

FIG. 7

| 0 | 1 | 0 | 0 |
|---|---|---|---|
| 1 | 1 | 1 | 1 |
| 0 | 1 | 0 | 0 |
| 0 | 0 | 1 | 0 |
| 1 | 1 | 1 | 1 |
| 1 | 0 | 0 | 0 |
| 1 | 1 | 1 | 1 |
| 0 | 0 | 0 | 0 |

FIG. 8

| RI | Beam information for layer 1 | Beam information for layer 2 | Base vector information for layer 1 | Base vector information for layer 2 | Information on the quantity of non-zero coefficients for layer 1 | Information on the quantity of non-zero coefficients for layer 2 | Non-zero coefficient position information for layer 1 | Non-zero coefficient position information for layer 2 | ... |

FIG. 9A

| Beam information for layer 1 | Beam information for layer 2 | Base vector information for layer 1 | Base vector information for layer 2 | Information on the quantity of non-zero coefficients for layer 1 | Information on the quantity of non-zero coefficients for layer 2 | Non-zero coefficient position information for layer 1 | Non-zero coefficient position information for layer 2 | ... |

FIG. 9B

| RI | Beam information for layer 1 | Beam information for layer 2 | Information on the quantity of non-zero coefficients for layer 1 | Information on the quantity of non-zero coefficients for layer 2 | Non-zero coefficient position information for layer 1 | Non-zero coefficient position information for layer 2 | Non-zero coefficient position information for layer 3 | Non-zero coefficient position information for layer 4 | ... |

FIG. 10A

| Base vector information for layer 1 | Base vector information for layer 2 | Base vector information for layer 3 | Base vector information for layer 4 | ... |

FIG. 10B

| RI | Beam information for layer 1 | Base vector information for layer 1 | Information on the quantity of non-zero coefficients for layer 1 | Information on the quantity of non-zero coefficients for layer 2 | Information on the quantity of non-zero coefficients for layer 3 | Information on the quantity of non-zero coefficients for layer 4 | Non-zero coefficient position information for layer 1 | Non-zero coefficient position information for layer 2 | ... |

FIG. 11A

| Beam information for layer 2 | Base vector information for layer 2 | Non-zero coefficient position information for layer 3 | Non-zero coefficient position information for layer 4 | ... |

FIG. 11B

| 0 | 1 | 1 | 0 | 0 | 0 | 0 | 1 | 0 | 0 | 0 | 1 | 0 | 0 | 0 | 0 |

FIG. 12

| 0 | 1 | 0 | 0 | 0 | 1 | 0 | 0 | 0 | 0 | 0 | 0 | 0 | 0 | 0 |

FIG. 13

| 1 | 0 | 0 | 1 | 0 | 0 | 0 | 0 | 0 | 0 | 0 | 1 | 1 |

FIG. 14

| 1 | 0 | 0 | 0 | 1 | 0 | 0 | 0 | 0 | 0 | 1 | 1 | 0 |

FIG. 15A

| 0 | 1 | 0 | 1 | 0 | 0 | 0 | 1 | 0 | 0 | 0 | 1 | 0 |

FIG. 15B

| 1 | 0 | 1 | 1 |
|---|---|---|---|
| 0 | 0 | 1 | 0 |
| 1 | 1 | 0 | 1 |
| 0 | 0 | 1 | 1 |

FIG. 16

| 0 | 1 | 1 | 1 |
|---|---|---|---|
| 0 | 0 | 1 | 0 |
| 1 | 1 | 0 | 1 |
| 0 | 0 | 1 | 1 |

FIG. 17

CHANNEL STATE INFORMATION REPORTING METHOD AND DEVICE

CROSS-REFERENCE OF RELATED APPLICATIONS

The present application is a US National Stage of International Application No. PCT/CN2019/128026, filed on Dec. 24, 2019, which claims the priority from Chinese Patent Application No. 201910215992.2, filed with the Chinese Patent Office on Mar. 21, 2019 and entitled "Method and Device for Reporting Channel State Information", which is hereby incorporated by reference in its entirety.

FIELD

The present application relates to the field of wireless communication technology, and in particular to a method and device for reporting channel state information.

BACKGROUND

The Type II codebook is defined in the NR (New Radio) system. The Type II codebook in Rel-15 is based on the linear combination of orthogonal beams and has the high channel quantization accuracy. However, since the feedback of each subband includes both the subband beam phase combining coefficient and the subband beam amplitude coefficient, the feedback overhead required to feedback the coefficients of all subbands is huge when the quantity of subbands is large.

The NR Rel-16 defines a low-overhead Type II codebook. Based on the method of linear combination of orthogonal beams and subband coefficient compression, the coefficients of each subband are compression, and the compression coefficients fed back to the base station. Taking Rank (order)=1 as an example, for all subbands, the codebook can be expressed as:

$$W = W_1 \tilde{W}_2 W_f^H =$$

$$\begin{bmatrix} b_{k_1^{(0)} k_2^{(0)}} & b_{k_1^{(1)} k_2^{(1)}} & \cdots & b_{k_1^{(L-1)} k_2^{(L-1)}} & 0 \\ 0 & & & & b_{k_1^{(0)} k_2^{(0)}} & b_{k_1^{(1)} k_2^{(1)}} & \cdots & b_{k_1^{(L-1)} k_2^{(L-1)}} \end{bmatrix}.$$

$$\begin{bmatrix} p_{0,0} \cdot c_{0,0} & p_{0,1} \cdot c_{0,1} & \cdots & p_{0,M-1} \cdot c_{0,M-1} \\ p_{1,0} \cdot c_{1,0} & p_{1,1} \cdot c_{1,1} & \cdots & p_{1,M-1} \cdot c_{1,M-1} \\ \vdots & \vdots & & \vdots \\ p_{2L-1,0} \cdot c_{2L-1,0} & p_{2L-1,1} \cdot c_{2L-1,1} & \cdots & p_{2L-1,M-1} \cdot c_{2L-1,M-1} \end{bmatrix}.$$

$$\begin{bmatrix} f_{0,0} & f_{0,1} & \cdots & f_{0,N-1} \\ f_{1,0} & f_{1,1} & \cdots & f_{1,N-1} \\ \vdots & \vdots & & \vdots \\ f_{M-1,0} & f_{M-1,1} & \cdots & f_{M-1,N-1} \end{bmatrix}$$

and the orthogonal beams contained in $W_1$ are the same as those in the Type II codebook of Rel-15;
$b_{k_1,k_2}$ represents the orthogonal beams, L represents the quantity of orthogonal beams in the group; $\tilde{W}_2$ represents the compression coefficient, and $p_{i,j}$ represents the amplitude coefficient, $c_{i,j}$ represents the phase coefficient, and the coefficients need to be fed back to the base station; $W_f$ represents the compression base vector which contains M base vectors, the length of each vector is N, and N is determined by the quantity of subbands. The compression coefficients in $\tilde{W}_2$ need to be quantized and then fed back to the base station. Currently, there is no corresponding CSI reporting method for the Rel-16 codebook structure.

To sum up, there is no corresponding CSI reporting method for the Rel-16 codebook structure at present.

SUMMARY

The present application provides a method and device for reporting channel state information, to solve the problem in the prior art that there is no corresponding CSI reporting method for the Rel-16 codebook structure.

In one embodiment, a method for reporting channel state information provided by embodiments of the present application includes:
determining, by a terminal, codebook indication information corresponding to a data transmission layer according to codebook parameter information;
sending, by the terminal, Channel State Information (CSI) containing the codebook indication information to a network side device;
and the codebook indication information includes a part or all of following information:
beam information for determining orthogonal beams in a precoding matrix, base vector information for determining compression base vectors in the precoding matrix, and non-zero coefficient indication information for determining compression coefficients in the precoding matrix.

In the above method, the terminal reports the CSI containing the codebook indication information to the network side device after determining the codebook indication information through measurement, and the codebook indication information directs at the Rel-16 codebook structure, and includes but not limited to a part or all of following information: beam information, base vector information and non-zero coefficient indication information. A CSI reporting method for the Rel-16 codebook structure is proposed, which realizes the reporting of the beam indication, base vector indication or non-zero coefficient position indication in the Type II CSI, and ensures an amount of feedback overhead.

In a possible implementation, the codebook indication information includes the beam information for determining orthogonal beams in the precoding matrix;
after the terminal determines the codebook indication information corresponding to the data transmission layer according to the codebook parameter information, and before sending the CSI containing the codebook indication information to the network side device, the method includes:
if it is determined that multiple data transmission layers correspond to same beam information, placing, by the terminal, the beam information corresponding to the multiple of data transmission layers in the CSI.

In the above method, when the terminal reports the beam information, if multiple data transmission layers use the same beams or the beams for one of the data transmission layers include beams for other layers based on the system pre-definition, it can be determined in such case that the multiple of data transmission layers correspond to the same beam information. In this case, only one piece of beam information can be reported, saving the overhead.

In a possible implementation, the codebook indication information includes the base vector information for determining compression base vectors in the precoding matrix;
after the terminal determines the codebook indication information corresponding to the data transmission layer according to the codebook parameter information, and before sending the CSI containing the codebook indication information to the network side device, the method includes:

if it is determined that multiple data transmission layers correspond to the same base vector information, placing, by the terminal, the base vector information corresponding to the multiple of data transmission layers in the CSI.

In the above method, when the terminal reports the base vector information, if multiple data transmission layers use the same compression base vectors or the compression base vectors for one of the data transmission layers contain the compression base vectors for other layers based on the system pre-definition, it can be determined in such case that the multiple of data transmission layers correspond to the same base vector information. In this case, only piece of one base vector information can be reported, saving the overhead.

In a possible implementation, the codebook indication information includes the non-zero coefficient indication information for determining compression coefficients in the precoding matrix;

after the terminal determines the codebook indication information corresponding to the data transmission layer according to the codebook parameter information, and before sending the CSI containing the codebook indication information to the network side device, the method includes:

if it is determined that multiple data transmission layers correspond to the same non-zero coefficient indication information, placing, by the terminal, the non-zero coefficient indication information corresponding to the multiple of data transmission layers in the CSI.

In the above method, when the terminal reports the non-zero coefficient indication information, if multiple data transmission layers use the non-zero coefficients of which the number and positions are both the same or the number and positions of non-zero coefficients for one of the data transmission layers contain the number and positions of non-zero coefficients for other layers based on the system pre-definition, it can be determined in such case that the multiple of data transmission layers correspond to the same non-zero coefficient indication information. In this case, only one piece of non-zero coefficient indication information can be reported, saving the overhead.

In a possible implementation, the codebook indication information includes the beam information for determining orthogonal beams in the precoding matrix, and the terminal determines the beam information by:

taking, by the terminal, a bitmap as the beam information corresponding to the data transmission layer, and bits in the bitmap correspond to candidate orthogonal beams, and a value of each bit indicates whether the data transmission layer uses an orthogonal beam corresponding to each bit; or taking, by the terminal, an index set as the beam information corresponding to the data transmission layer, and the index set includes indexes of orthogonal beams for the data transmission layer; or taking, by the terminal, combination index information as the codebook indication information corresponding to the data transmission layer, and the combination index information has X bits, X is determined according to a quantity of candidate orthogonal beams and a quantity of orthogonal beams for the data transmission layer, and the combination index information indicates a position of combination of codebook parameters for the data transmission layer in all combinations of the candidate orthogonal beams;

the codebook indication information includes the base vector information for determining compression base vectors in the precoding matrix, and the terminal determines the base vector information by:

taking, by the terminal, a bitmap as the base vector information corresponding to the data transmission layer, and bits in the bitmap correspond to candidate compression base vectors, and a value on each bit indicates whether the data transmission layer uses a compression base vector corresponding to each bit; or taking, by the terminal, an index set as the base vector information corresponding to the data transmission layer, and the index set includes indexes of compression base vectors for the data transmission layer; or taking, by the terminal, combination index information as the base vector information corresponding to the data transmission layer, and the combination index information has X bits, X is determined according to the quantity of candidate compression base vectors and the quantity of compression base vectors for the data transmission layer, and the combination index information indicates a position of combination of compression base vectors for the data transmission layer in all combinations of candidate compression base vectors;

the codebook indication information includes the non-zero coefficient indication information for determining compression coefficients in the precoding matrix, and the terminal determines the non-zero coefficient indication information by:

taking, by the terminal, a bitmap as the non-zero coefficient indication information corresponding to the data transmission layer, and bits in the bitmap correspond to candidate non-zero coefficient positions, and a value on each bit indicates whether the data transmission layer uses a non-zero coefficient position corresponding to each bit; or taking, by the terminal, an index set as the non-zero coefficient indication information corresponding to the data transmission layer, and the index set includes indexes of non-zero coefficient positions for the data transmission layer; or taking, by the terminal, combination index information as the non-zero coefficient indication information corresponding to the data transmission layer, and the combination index information has X bits, X is determined according to the quantity of candidate non-zero coefficient positions and the quantity of non-zero coefficient positions for the data transmission layer, and the combination index information indicates a position of combination of non-zero coefficient positions for the data transmission layer in all combinations of the candidate non-zero coefficient positions.

In the above method, the terminal indicates, in the form of bitmap, index set, or combination index information, the codebook indication information obtained by measurement, which clearly indicates those for the terminal among the candidate orthogonal beams, candidate compression base vectors, or candidate non-zero coefficient positions, and achieves the high-performance information indication.

In a possible implementation, if the codebook indication information includes the non-zero coefficient indication information for determining compression coefficients in the precoding matrix, and the terminal places non-zero coefficient position information in the non-zero coefficient indication information in a second part of the CSI;

the method includes:

placing, by the terminal, information on a quantity of non-zero coefficients in the non-zero coefficient indication information in a first part of the CSI.

In the above method, when the non-zero coefficient position information in the non-zero coefficient indication information is located in Part 2 of CSI, the information on the quantity of non-zero coefficients in the non-zero coefficient indication information needs to be placed in Part 1 of CSI, which is convenient for the network side device to determine the compression coefficients when decoding the CSI.

In a possible implementation, after the terminal determines the codebook indication information corresponding to the data transmission layer according to the codebook parameter information, and before sending the CSI containing the codebook indication information to the network side device, the method includes:

placing, by the terminal, all of the codebook indication information in a first part or a second part of the CSI; or placing, by the terminal, a part of the codebook indication information in a first part of the CSI, and a remaining part of the codebook indication information in a second part of the CSI.

In the above method, there are many ways to place the codebook indication information in the CSI. For example, all is placed in Part 1 of CSI, all is placed in Part 2 of CSI, or some is placed in Part 1 of CSI and the other is placed in the second part of CSI, enriching the CSI reporting methods.

In one embodiment, a method for reporting channel state information provided by embodiments of the present application includes:

receiving, by a network side device, CSI containing codebook indication information corresponding to a data transmission layer reported by a terminal;

determining, by the network side device, precoding matrix of the terminal after decoding the CSI according to the codebook indication information in the CSI;

and the codebook indication information includes a part or all of following information:

beam information for determining orthogonal beams in the precoding matrix, base vector information for determining compression base vectors in the precoding matrix, and non-zero coefficient indication information for determining compression coefficients in the precoding matrix.

In the above method, the network side device receives the CSI containing the codebook indication information sent by the terminal, and the codebook indication information directs at the Rel-16 codebook structure, and includes but not limited to a part or all of following information: beam information, base vector information and non-zero coefficient indication information. The network side device can determine the precoding matrix for the terminal by decoding the CSI. A CSI reporting method for the Rel-16 codebook structure is proposed, which realizes the reporting of the beam indication, base vector indication or non-zero coefficient position indication in the Type II CSI, and ensures an amount of feedback overhead.

In a possible implementation, the codebook indication information includes the beam information for determining orthogonal beams in the precoding matrix; and decoding, by the network side device, the CSI according to the codebook indication information in the CSI, includes:

determining, by the network side device, orthogonal beams for multiple data transmission layers in candidate orthogonal beams according to beam information corresponding to the multiple of data transmission layers, if the network side device determines that the beam information in the CSI corresponds to the multiple of data transmission layers.

In the above method, if a piece of beam information in the CSI corresponds to multiple data transmission layers, that is, multiple data transmission layers have the same beam information, the network side device determines the orthogonal beams for each of the multiple of predefined coding layers according to the system pre-definition or the configuration information of the network side device at this time, saving the overhead.

In a possible implementation, the codebook indication information includes the base vector information for determining compression base vectors in the precoding matrix; and decoding, by the network side device, the CSI according to the codebook indication information in the CSI, includes:

determining, by the network side device, compression base vectors for multiple data transmission layers in candidate compression base vectors according to base vector information corresponding to the multiple of data transmission layers, if the network side device determines that the base vector information in the CSI corresponds to the multiple of data transmission layers.

In the above method, if a piece of base vector information in the CSI corresponds to multiple data transmission layers, that is, multiple data transmission layers have the same base vector information, the network side device determines the compression base vectors for each of the multiple of predefined coding layers according to the system pre-definition or the configuration information of the network side device at this time, saving the overhead.

In a possible implementation, the codebook indication information includes the non-zero coefficient indication information for determining compression coefficients in the precoding matrix; and decoding, by the network side device, the CSI according to the codebook indication information in the CSI, includes:

determining, by the network side device, positions of non-zero coefficients in compression coefficients for multiple data transmission layers in candidate non-zero coefficient positions according to non-zero coefficient indication information corresponding to the multiple of data transmission layers, if the network side device determines that non-zero coefficient indication information in the CSI corresponds to the multiple of data transmission layers.

In the above method, if a piece of non-zero coefficient indication information in the CSI corresponds to multiple data transmission layers, that is, multiple data transmission layers have the same non-zero coefficient indication information, the network side device determines the positions of the non-zero coefficients for each of the multiple of predefined coding layers according to the system pre-definition or the configuration information of the network side device at this time, saving the overhead.

In a possible implementation, the codebook indication information includes the beam information for determining orthogonal beams in the precoding matrix; and decoding, by the network side device, the CSI according to the codebook indication information in the CSI, includes:

if the beam information is a bitmap, determining, by the network side device, orthogonal beams for the data transmission layer according to bits in the bitmap and values on the bits, and the bits in the bitmap correspond to candidate orthogonal beams, and the a value of each bit indicates whether the data transmission layer uses an orthogonal beam corresponding to each bit; or if the beam information is an index set, determining, by the network side device, orthogonal beams for the data transmission layer according to indexes in the index set, and the index set includes indexes of orthogonal beams for the data transmission layer; or if the beam information is combination index information, determining, by the network side device, a position of combination of orthogonal beams for the data transmission layer in all combinations of candidate orthogonal beams according to the combination index information and then the orthogonal beams for the data transmission layer according to the position, and the combination index information has X bits, X is determined according to the quantity of the candidate orthogonal beams and the quantity of orthogonal beams for the data transmission layer, and the combination index information indicates the position of combination of orthogonal beams for the data transmission layer in all combinations of the candidate orthogonal beams;

the codebook indication information includes the base vector information for determining compression base vectors in the precoding matrix; and decoding, by the network side device, the CSI according to the codebook indication information in the CSI, includes:

if the base vector information is a bitmap, determining, by the network side device, compression base vectors for the data transmission layer according to bits in the bitmap and values on the bits, and the bits in the bitmap correspond to candidate compression base vectors, and a value on each bit indicates whether the data transmission layer uses a compression base vector corresponding to each bit; or if the base vector information is an index set, determining, by the network side device, compression base vectors for the data transmission layer according to indexes in the index set, and the index set includes indexes of compression base vectors for the data transmission layer; or if the base vector information is combination index information, determining, by the network side device, a position of combination of compression base vectors for the data transmission layer in all combinations of candidate compression base vectors according to the combination index information and then the compression base vectors for the data transmission layer according to the position, and the combination index information has X bits, X is determined according to the quantity of candidate compression base vectors and the quantity of compression base vectors for the data transmission layer, and the combination index information indicates the position of combination of compression base vectors for the data transmission layer in all combinations of the candidate compression base vectors;

the codebook indication information includes the non-zero coefficient indication information for determining compression coefficients in the precoding matrix; and decoding, by the network side device, the CSI according to the codebook indication information in the CSI, includes:

if the non-zero coefficient indication information is a bitmap, determining, by the network side device, non-zero coefficient positions for the data transmission layer according to bits in the bitmap and values on the bits, and the bits in the bitmap correspond to candidate non-zero coefficient positions, and a value on each bit indicates whether the data transmission layer uses a non-zero coefficient position corresponding to each bit; or if the non-zero coefficient indication information is an index set, determining, by the network side device, non-zero coefficient positions for the data transmission layer according to indexes in the index set, and the index set includes indexes of non-zero coefficient positions for the data transmission layer, or if the non-zero coefficient indication information is combination index information, determining, by the network side device, a position of combination of non-zero coefficient positions for the data transmission layer in all combinations of candidate non-zero coefficient positions according to the combination index information and then the non-zero coefficient positions for the data transmission layer according to the position, and the combination index information has X bits, X is determined according to the quantity of the candidate non-zero coefficient positions and the quantity of non-zero coefficient positions for the data transmission layer, and the combination index information indicates the position of combination of non-zero coefficient positions for the data transmission layer in all combinations of the candidate non-zero coefficient positions.

In the above method, the codebook indication information measured by the terminal is expressed in the form of bitmap, index set, or combination index information, which clearly indicates those for the terminal among the candidate orthogonal beams or compression base vectors or non-zero coefficient positions, and achieves the high-performance information indication.

In a possible implementation, the codebook indication information includes the non-zero coefficient indication information for determining compression coefficients in the precoding matrix; and determining, by the network side device, precoding matrix of the terminal after decoding the CSI according to the codebook indication information in the CSI, includes:

determining, by the network side device, compression coefficients for the data transmission layer according to non-zero coefficient positions for the data transmission layer and a bit set corresponding to candidate non-zero coefficient positions, and the bit set includes the quantity of bits occupied by quantized amplitude coefficients of the candidate non-zero coefficient positions and the quantity of bits occupied by quantized phase coefficients of the candidate non-zero coefficient positions.

In the above method, when determining the compression coefficients for the data transmission layer, the network side device needs to determine the quantity and positions of non-zero coefficients according to the non-zero coefficient indication information, and then needs to determine the compression coefficients for the data transmission layer according to the quantity of bits occupied by the amplitude coefficient and phase coefficient of each non-zero coefficient after quantization, thus determining the precoding matrix of the terminal.

In a possible implementation, the codebook indication information includes the non-zero coefficient indication information for determining compression coefficients in the precoding matrix, and position information in the non-zero coefficient indication information is located in a second part of the CSI;

the method includes:

determining, by the network side device, the quantity of non-zero coefficients according to information on the quantity of non-zero coefficients in a first part of the CSI or configuration information of the network side device or system pre-definition.

In the above method, when the non-zero coefficient position information in the non-zero coefficient indication information is located in Part 2 of CSI, the information on the quantity of non-zero coefficients in the non-zero coefficient indication information needs to be placed in Part 1 of CSI, which is convenient for the network side device to determine the compression coefficients when decoding the CSI.

In a possible implementation, after the network side device receives the CSI containing the codebook indication information corresponding to the data transmission layer reported by the terminal, and before the network side device determines the precoding matrix of the terminal after decoding the CSI according to the codebook indication information in the CSI, the method includes:

determining, by the network side device, all of the codebook indication information according to a first part or a second part of the CSI; or determining, by the network side device, a part of the codebook indication information according to a first part of the CSI and a remaining part of the codebook indication information according to a second part of the CSI.

In the above method, there are many ways when the terminal reports the CSI, and there are many corresponding processing ways for the network side device after receiving the CSI, realizing a variety of possible CSI decoding ways.

In one embodiment, a device for reporting channel state information provided by embodiments of the present application includes: a processor and a memory, and the processor is configured to read a program in the memory and perform the process of:

determining codebook indication information corresponding to a data transmission layer according to codebook parameter information;

sending CSI containing the codebook indication information to a network side device;

and the codebook indication information includes a part or all of following information:

beam information for determining orthogonal beams in the precoding matrix, base vector information for determining compression base vectors in the precoding matrix, and non-zero coefficient indication information for determining compression coefficients in the precoding matrix.

In a possible implementation, the codebook indication information includes the beam information for determining orthogonal beams in the precoding matrix;

the processor is configured to:

if it is determined that multiple data transmission layers correspond to the same beam information, place the beam information corresponding to the multiple of data transmission layers in the CSI.

In a possible implementation, the codebook indication information includes the base vector information for determining compression base vectors in the precoding matrix;

the processor is configured to:

if it is determined that multiple data transmission layers correspond to the same base vector information, place the base vector information corresponding to the multiple of data transmission layers in the CSI.

In a possible implementation, the codebook indication information includes the non-zero coefficient indication information for determining compression coefficients in the precoding matrix;

the processor is configured to:

if it is determined that multiple data transmission layers correspond to the same non-zero coefficient indication information, place the non-zero coefficient indication information corresponding to the multiple of data transmission layers in the CSI.

In a possible implementation, the codebook indication information includes the beam information for determining orthogonal beams in the precoding matrix, and the processor is configured to determine the beam information by:

taking a bitmap as the beam information corresponding to the data transmission layer, and bits in the bitmap correspond to candidate orthogonal beams, and a value of each bit indicates whether the data transmission layer uses an orthogonal beam corresponding to each bit; or taking an index set as the beam information corresponding to the data transmission layer, and the index set includes indexes of orthogonal beams for the data transmission layer; or taking combination index information as the codebook indication information corresponding to the data transmission layer, and the combination index information has X bits, X is determined according to the quantity of candidate orthogonal beams and the quantity of orthogonal beams for the data transmission layer, and the combination index information indicates a position of combination of codebook parameters for the data transmission layer in all combinations of candidate codebook parameters;

the codebook indication information includes the base vector information for determining compression base vectors in the precoding matrix, and the processor is configured to determine the base vector information by:

taking a bitmap as the base vector information corresponding to the data transmission layer, and bits in the bitmap correspond to candidate compression base vectors, and a value on each bit indicates whether the data transmission layer uses a compression base vector corresponding to each bit; or taking an index set as the base vector information corresponding to the data transmission layer, and the index set includes indexes of compression base vectors for the data transmission layer; or taking combination index information as the base vector information corresponding to the data transmission layer, and the combination index information has X bits, X is determined according to the quantity of candidate compression base vectors and the quantity of compression base vectors for the data transmission layer, and the combination index information indicates a position of combination of compression base vectors for the data transmission layer in all combinations of the candidate compression base vectors;

the codebook indication information includes the non-zero coefficient indication information for determining compression coefficients in the precoding matrix, and the processor is configured to determine the non-zero coefficient indication information by:

taking a bitmap as the non-zero coefficient indication information corresponding to the data transmission layer, and bits in the bitmap correspond to candidate non-zero coefficient positions, and a value on each bit indicates whether the data transmission layer uses a non-zero coefficient position corresponding to each bit; or taking an index set as the non-zero coefficient indication information corresponding to the data transmission layer, and the index set includes indexes of non-zero coefficient positions for the data transmission layer; or taking combination index information as the non-zero coefficient indication information corresponding to the data transmission layer, and the combination index information has X bits, X is determined according to the quantity of candidate non-zero coefficient positions and the quantity of non-zero coefficient positions for the data transmission layer, and the combination index information indicates a position of combination of non-zero coefficient positions for the data transmission layer in all combinations of the candidate non-zero coefficient positions.

In a possible implementation, if the codebook indication information includes the non-zero coefficient indication information for determining compression coefficients in the precoding matrix and the terminal places non-zero coefficient position information in the non-zero coefficient indication information in a second part of the CSI, the processor is configured to:

place information on the quantity of non-zero coefficients in the non-zero coefficient indication information in a first part of the CSI.

In a possible implementation, the processor is configured to:

place all of the codebook indication information in a first part or a second part of the CSI; or place a part of the codebook indication information in a first part of the CSI, and a remaining part of the codebook indication information in a second part of the CSI.

In one embodiment, a device for reporting channel state information provided by embodiments of the present application includes: a processor and a memory, and the processor is configured to read a program in the memory and perform the process of:

receiving CSI containing codebook indication information corresponding to a data transmission layer reported by a terminal;

determining a precoding matrix of the terminal after decoding the CSI according to the codebook indication information in the CSI;

and the codebook indication information includes a part or all of following information:

beam information for determining orthogonal beams in the precoding matrix, base vector information for determining compression base vectors in the precoding matrix, and non-zero coefficient indication information for determining compression coefficients in the precoding matrix.

In a possible implementation, the codebook indication information includes the beam information for determining orthogonal beams in the precoding matrix, and the processor is configured to: determine orthogonal beams for multiple data transmission layers in candidate orthogonal beams according to beam information corresponding to the multiple of data transmission layers, if it is determined that the beam information in the CSI corresponds to the multiple of data transmission layers.

In a possible implementation, the codebook indication information includes the base vector information for determining compression base vectors in the precoding matrix, and the processor is configured to:

determine compression base vectors for multiple data transmission layers in candidate compression base vectors according to base vector information corresponding to the multiple of data transmission layers, if it is determined that the base vector information in the CSI corresponds to the multiple of data transmission layers.

In a possible implementation, the codebook indication information includes the non-zero coefficient indication information for determining compression coefficients in the precoding matrix, and the processor is configured to:

determine positions of non-zero coefficients in compression coefficients for multiple data transmission layers in candidate non-zero coefficient positions according to non-zero coefficient indication information corresponding to the multiple of data transmission layers, if it is determined that the non-zero coefficient indication information in the CSI corresponds to the multiple of data transmission layers.

In a possible implementation, the codebook indication information includes the beam information for determining orthogonal beams in the precoding matrix, and the processor is configured to:

if the beam information is a bitmap, determine orthogonal beams for the data transmission layer according to bits in the bitmap and values on the bits, and the bits in the bitmap correspond to candidate orthogonal beams, and the a value of each bit indicates whether the data transmission layer uses an orthogonal beam corresponding to each bit; or if the beam information is an index set, determine orthogonal beams for the data transmission layer according to indexes in the index set, and the index set includes indexes of orthogonal beams for the data transmission layer; or if the beam information is combination index information, determine a position of combination of orthogonal beams for the data transmission layer in all combinations of candidate orthogonal beams according to the combination index information and then the orthogonal beams for the data transmission layer according to the position, and the combination index information has X bits, X is determined according to the quantity of the candidate orthogonal beams and the quantity of orthogonal beams for the data transmission layer, and the combination index information indicates the position of combination of orthogonal beams for the data transmission layer in all combinations of the candidate orthogonal beams;

the codebook indication information includes the base vector information for determining compression base vectors in the precoding matrix, and the processor is configured to:

if the base vector information is a bitmap, determine compression base vectors for the data transmission layer according to bits in the bitmap and values on the bits, and the bits in the bitmap correspond to candidate compression base vectors, and a value on each bit indicates whether the data transmission layer uses a compression base vector corresponding to each bit; or if the base vector information is an index set, determine compression base vectors for the data transmission layer according to indexes in the index set, and the index set includes indexes of compression base vectors for the data transmission layer; or if the base vector information is combination index information, determine a position of combination of compression base vectors for the data transmission layer in all combinations of candidate compression base vectors according to the combination index information and then the compression base vectors for the data transmission layer according to the position, and the combination index information has X bits, X is determined according to the quantity of the candidate compression base vectors and the quantity of compression base vectors for the data transmission layer, and the combination index information indicates the position of combination of compression base vectors for the data transmission layer in all combinations of the candidate compression base vectors;

the codebook indication information includes the non-zero coefficient indication information for determining compression coefficients in the precoding matrix, and the processor is configured to:

if the non-zero coefficient indication information is a bitmap, determine non-zero coefficient positions for the data transmission layer according to bits in the bitmap and values on the bits, and the bits in the bitmap correspond to candidate non-zero coefficient positions, and a value on each bit indicates whether the data transmission layer uses a non-zero coefficient position corresponding to each bit; or if the non-zero coefficient indication information is an index set, determine non-zero coefficient positions for the data transmission layer according to indexes in the index set, and the index set includes indexes of non-zero coefficient positions for the data transmission layer; or if the non-zero coefficient indication information is combination index information, determine a position of combination of non-zero coefficient positions for the data transmission layer in all combinations of candidate non-zero coefficient positions according to the combination index information and then the non-zero coefficient positions for the data transmission layer according to the position, and the combination index information has X bits, X is determined according to the quantity of candidate non-zero coefficient positions and the quantity of non-zero coefficient positions for the data transmission layer, and the combination index information indicates the position of combination of non-zero coefficient positions for the data transmission layer in all combinations of the candidate non-zero coefficient positions.

In a possible implementation, the codebook indication information includes the non-zero coefficient indication information for determining compression coefficients in the precoding matrix, and the processor is configured to:

determine compression coefficients for the data transmission layer according to non-zero coefficient positions for the data transmission layer and a bit set corresponding to candidate non-zero coefficient positions, and the bit set includes the quantity of bits occupied by quantized amplitude coefficients of the candidate non-zero coefficient positions and the quantity of bits occupied by quantized phase coefficients of the candidate non-zero coefficient positions.

In a possible implementation, if the codebook indication information includes the non-zero coefficient indication information for determining compression coefficients in the precoding matrix, and position information in the non-zero coefficient indication information is located in a second part of the CSI;

the processor is configured to:

determine the quantity of non-zero coefficients according to information on the quantity of non-zero coefficients in a first part of the CSI or configuration information of the network side device or system pre-definition.

In a possible implementation, the processor is configured to:

determine all of the codebook indication information according to a first part or a second part of the CSI; or determine a part of the codebook indication information according to a first part of the CSI and a remaining part of the codebook indication information according to a second part of the CSI.

One embodiment of the present application further provides a device for reporting channel state information, which includes a processing device and a sending device:

the processing device is configured to determine codebook indication information corresponding to a data transmission layer according to codebook parameter information;

the sending device is configured to send the CSI containing the codebook indication information to a network side device;

and the codebook indication information includes a part or all of following information:

beam information for determining orthogonal beams in a precoding matrix, base vector information for determining compression base vectors in the precoding matrix, and non-zero coefficient indication information for determining compression coefficients in the precoding matrix.

In a possible implementation, the codebook indication information includes the beam information for determining orthogonal beams in the precoding matrix;

the processing device is further configured to:

if it is determined that multiple data transmission layers correspond to the same beam information, place the beam information corresponding to the multiple of data transmission layers in the CSI.

In a possible implementation, the codebook indication information includes the base vector information for determining compression base vectors in the precoding matrix;

the processing device is further configured to:

if it is determined that multiple data transmission layers correspond to the same base vector information, place the base vector information corresponding to the multiple of data transmission layers in the CSI.

In a possible implementation, the codebook indication information includes the non-zero coefficient indication information for determining compression coefficients in the precoding matrix;

the processing device is further configured to:

if it is determined that multiple data transmission layers correspond to the same non-zero coefficient indication information, place the non-zero coefficient indication information corresponding to the multiple of data transmission layers in the CSI.

In a possible implementation, the codebook indication information includes the beam information for determining orthogonal beams in the precoding matrix, and the processing device is further configured to determine the beam information by:

taking a bitmap as the beam information corresponding to the data transmission layer, and bits in the bitmap correspond to candidate orthogonal beams, and a value of each bit indicates whether the data transmission layer uses an orthogonal beam corresponding to each bit; or taking an index set as the beam information corresponding to the data transmission layer, and the index set includes indexes of orthogonal beams for the data transmission layer; or taking combination index information as the codebook indication information corresponding to the data transmission layer, and the combination index information has X bits, X is determined according to the quantity of candidate orthogonal beams and the quantity of orthogonal beams for the data transmission layer, and the combination index information indicates a position of combination of codebook parameters for the data transmission layer in all combinations of the candidate codebook parameters;

the codebook indication information includes the base vector information for determining compression base vectors in the precoding matrix, and the processing device is further configured to determine the base vector information by:

taking a bitmap as the base vector information corresponding to the data transmission layer, and bits in the bitmap correspond to candidate compression base vectors, and a value on each bit indicates whether the data transmission layer uses a compression base vector corresponding to each bit; or taking an index set as the base vector information corresponding to the data transmission layer, and the index set includes indexes of compression base vectors for the data transmission layer; or taking combination index information as the base vector information corresponding to the data transmission layer, and the combination index information has X bits, X is determined according to the quantity of candidate compression base vectors and the quantity of compression base vectors for the data transmission layer, and the combination index information indicates a position of combination of compression base vectors for the data transmission layer in all combinations of candidate compression base vectors;

the codebook indication information includes the non-zero coefficient indication information for determining compression coefficients in the precoding matrix, and the processing device is further configured to determine the non-zero coefficient indication information by:

taking a bitmap as the non-zero coefficient indication information corresponding to the data transmission layer, and bits in the bitmap correspond to candidate non-zero coefficient positions, and a value on each bit indicates whether the data transmission layer uses a non-zero coefficient position corresponding to each bit; or taking an index set as the non-zero coefficient indication information corresponding to the data transmission layer, and the index set includes indexes of non-zero coefficient positions for the data transmission layer; or taking combination index information as the non-zero coefficient indication information corresponding to the data transmission layer, and the combination index information has X bits, X is determined according to the quantity of candidate non-zero coefficient positions and the quantity of non-zero coefficient positions for the data transmission layer, and the combination index information indicates a position of combination of non-zero coefficient positions for the data transmission layer in all combinations of the candidate non-zero coefficient positions.

In a possible implementation, if the codebook indication information includes the non-zero coefficient indication information for determining compression coefficients in the precoding matrix and the terminal places non-zero coefficient position information in the non-zero coefficient indication information in a second part of the CSI, the processing device is further configured to:

place information on the quantity of non-zero coefficients in the non-zero coefficient indication information in a first part of the CSI.

In a possible implementation, the processing device is further configured to:

place all of the codebook indication information in a first part or a second part of the CSI; or place a part of the codebook indication information in a first part of the CSI, and a remaining part of the codebook indication information in a second part of the CSI.

One embodiment of the present application further provides a device for reporting channel state information, which includes a receiving device and a processing device:

the receiving device is configured to receive the CSI containing codebook indication information corresponding to a data transmission layer reported by a terminal;

the processing device is configured to determine a precoding matrix of the terminal after decoding the CSI according to the codebook indication information in the CSI;

and the codebook indication information includes a part or all of following information:

beam information for determining orthogonal beams in the precoding matrix, base vector information for determining compression base vectors in the precoding matrix, and non-zero coefficient indication information for determining compression coefficients in the precoding matrix.

In a possible implementation, the codebook indication information includes the beam information for determining orthogonal beams in the precoding matrix, and the processing device is configured to:

determine orthogonal beams for multiple data transmission layers in candidate orthogonal beams according to beam information corresponding to the multiple of data transmission layers, if it is determined that the beam information in the CSI corresponds to the multiple of data transmission layers.

In a possible implementation, the codebook indication information includes the base vector information for determining compression base vectors in the precoding matrix, and the processing device is configured to:

determine compression base vectors for multiple data transmission layers in candidate compression base vectors according to base vector information corresponding to the multiple of data transmission layers, if it is determined that the base vector information in the CSI corresponds to the multiple of data transmission layers.

In a possible implementation, the codebook indication information includes the non-zero coefficient indication information for determining compression coefficients in the precoding matrix, and the processing device is configured to:

determine positions of non-zero coefficients in compression coefficients for multiple data transmission layers in candidate non-zero coefficient positions according to non-zero coefficient indication information corresponding to the multiple of data transmission layers, if it is determined that the non-zero coefficient indication information in the CSI corresponds to the multiple of data transmission layers.

In a possible implementation, the codebook indication information includes the beam information for determining orthogonal beams in the precoding matrix, and the processing device is configured to:
  if the beam information is a bitmap, determine orthogonal beams for the data transmission layer according to bits in the bitmap and values on the bits, and the bits in the bitmap correspond to candidate orthogonal beams, and the a value of each bit indicates whether the data transmission layer uses an orthogonal beam corresponding to each bit; or
  if the beam information is an index set, determine orthogonal beams for the data transmission layer according to indexes in the index set, and the index set includes indexes of orthogonal beams for the data transmission layer; or
  if the beam information is combination index information, determine a position of combination of orthogonal beams for the data transmission layer in all combinations of candidate orthogonal beams according to the combination index information and then the orthogonal beams for the data transmission layer according to the position, and the combination index information has X bits, X is determined according to the quantity of candidate orthogonal beams and the quantity of orthogonal beams for the data transmission layer, and the combination index information indicates the position of combination of orthogonal beams for the data transmission layer in all combinations of the candidate orthogonal beams;
  the codebook indication information includes the base vector information for determining compression base vectors in the precoding matrix, and the processing device is configured to:
  if the base vector information is a bitmap, determine compression base vectors for the data transmission layer according to bits in the bitmap and values on the bits, and the bits in the bitmap correspond to candidate compression base vectors, and a value on each bit indicates whether the data transmission layer uses a compression base vector corresponding to each bit; or
  if the base vector information is an index set, determine compression base vectors for the data transmission layer according to indexes in the index set, and the index set includes indexes of compression base vectors for the data transmission layer; or
  if the base vector information is combination index information, determine a position of combination of compression base vectors for the data transmission layer in all combinations of candidate compression base vectors according to the combination index information and then the compression base vectors for the data transmission layer according to the position, and the combination index information has X bits, X is determined according to the quantity of candidate compression base vectors and the quantity of compression base vectors for the data transmission layer, and the combination index information indicates the position of combination of compression base vectors for the data transmission layer in all combinations of the candidate compression base vectors;

the codebook indication information includes the non-zero coefficient indication information for determining compression coefficients in the precoding matrix, and the processing device is configured to:
  if the non-zero coefficient indication information is a bitmap, determine non-zero coefficient positions for the data transmission layer according to bits in the bitmap and values on the bits, and the bits in the bitmap correspond to candidate non-zero coefficient positions, and a value on each bit indicates whether the data transmission layer uses a non-zero coefficient position corresponding to each bit; or
  if the non-zero coefficient indication information is an index set, determine non-zero coefficient positions for the data transmission layer according to indexes in the index set, and the index set includes indexes of non-zero coefficient positions for the data transmission layer; or
  if the non-zero coefficient indication information is combination index information, determine a position of combination of non-zero coefficient positions for the data transmission layer in all combinations of candidate non-zero coefficient positions according to the combination index information and then the non-zero coefficient positions for the data transmission layer according to the position, and the combination index information has X bits, X is determined according to the quantity of candidate non-zero coefficient positions and the quantity of non-zero coefficient positions for the data transmission layer, and the combination index information indicates the position of combination of non-zero coefficient positions for the data transmission layer in all combinations of the candidate non-zero coefficient positions.

In a possible implementation, the codebook indication information includes the non-zero coefficient indication information for determining compression coefficients in the precoding matrix, and the processing device is configured to:
  determine compression coefficients for the data transmission layer according to non-zero coefficient positions for the data transmission layer and a bit set corresponding to candidate non-zero coefficient positions, and the bit set includes the quantity of bits occupied by quantized amplitude coefficients of the candidate non-zero coefficient positions and the quantity of bits occupied by quantized phase coefficients of the candidate non-zero coefficient positions.

In a possible implementation, if the codebook indication information includes the non-zero coefficient indication information for determining compression coefficients in the precoding matrix, and position information in the non-zero coefficient indication information is located in a second part of the CSI;
  the processing device is further configured to:
    determine the quantity of non-zero coefficients according to information on the quantity of non-zero coefficients in a first part of the CSI or configuration information of the network side device or system pre-definition.

In a possible implementation, the processing device is further configured to:
  determine all of the codebook indication information according to a first part or a second part of the CSI; or determine a part of the codebook indication information according to a first part of the CSI and a remaining part of the codebook indication information according to a second part of the CSI.

One embodiment of the present application further provides a computer storage medium storing a computer program thereon, where the program implements the steps of the method described in the other embodiment when executed by a processing unit.

Furthermore, the effects brought about by any implementation in the other embodiments can refer to the technical effects brought about by different implementations of the embodiments, and will not be repeated here.

BRIEF DESCRIPTION OF THE DRAWINGS

In order to illustrate the in the embodiments of the present application more clearly, the accompanying figures which need to be used in describing the embodiments will be introduced below briefly.

FIG. 1A is a schematic diagram of a first part of the CSI for the Rel-15 Type II codebook structure provided by embodiments of the present application.

FIG. 1B is a schematic diagram of a second part of the CSI for the Rel-15 Type II codebook structure provided by embodiments of the present application.

FIG. 2 is a schematic diagram of a system for reporting the channel state information provided by embodiments of the present application.

FIG. 3 is a schematic diagram of a first bitmap representing the beam information provided by embodiments of the present application.

FIG. 4 is a schematic diagram of a second bitmap representing the beam information provided by embodiments of the present application.

FIG. 5 is a schematic diagram of a first bitmap representing the base vector information provided by embodiments of the present application.

FIG. 6 is a schematic diagram of a second bitmap representing the base vector information provided by embodiments of the present application.

FIG. 7 is a schematic diagram of a first bitmap representing the non-zero coefficient indication information provided by embodiments of the present application.

FIG. 8 is a schematic diagram of a second bitmap representing the non-zero coefficient indication information provided by embodiments of the present application.

FIG. 9A is a schematic diagram of a first part of the first CSI for the Rel-16 Type II codebook structure provided by embodiments of the present application.

FIG. 9B is a schematic diagram of a second part of the first CSI for the Rel-16 Type II codebook structure provided by embodiments of the present application.

FIG. 10A is a schematic diagram of a first part of the second CSI for the Rel-16 Type II codebook structure provided by embodiments of the present application.

FIG. 10B is a schematic diagram of a second part of the second CSI for the Rel-16 Type II codebook structure provided by embodiments of the present application.

FIG. 11A is a schematic diagram of a first part of the third CSI for the Rel-16 Type II codebook structure provided by embodiments of the present application.

FIG. 11B is a schematic diagram of a third part of the third CSI for the Rel-16 Type II codebook structure provided by embodiments of the present application.

FIG. 12 is a schematic diagram of a third bitmap representing the beam information provided by embodiments of the present application.

FIG. 13 is a schematic diagram of a fourth bitmap representing the beam information provided by embodiments of the present application.

FIG. 14 is a schematic diagram of a third bitmap representing the base vector information provided by embodiments of the present application.

FIG. 15A is a schematic diagram of a fourth bitmap representing the base vector information provided by embodiments of the present application.

FIG. 15B is a schematic diagram of a fifth bitmap representing the base vector information provided by embodiments of the present application.

FIG. 16 is a schematic diagram of a third bitmap representing the non-zero coefficient indication information provided by embodiments of the present application.

FIG. 17 is a schematic diagram of a fourth bitmap representing the non-zero coefficient indication information provided by embodiments of the present application.

DETAILED DESCRIPTION

Figure 18:
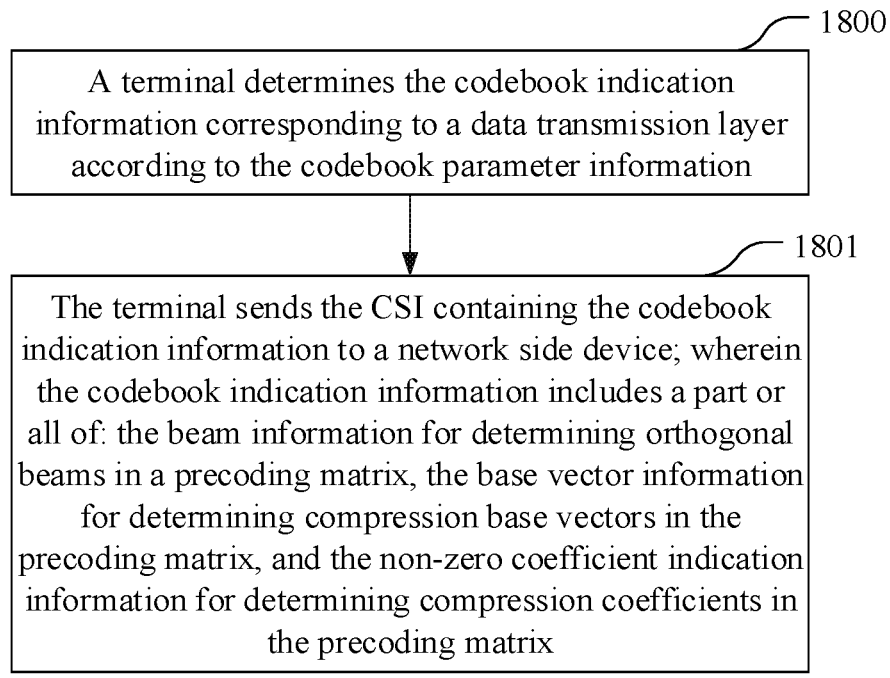
FIG. 18 is a schematic diagram of a first method for reporting the channel state information provided by embodiments of the present application.

Embodiments of the present application will be further illustrated below in details with reference to the accompanying figures. The described embodiments are merely a part of the embodiments of the present application but not all the embodiments.

Some words that appear herein will be explained below.

1. The term "and/or" in the embodiments of the present application describes the association relationship of associated objects, indicating that there may be three relationships, for example, A and/or B may represent: only A, both A and B, and only B. The character "/" generally indicates that the associated objects have a kind of "or" relationship.

2. The term "data transmission layer" in the embodiments of the present application represents the input of the precoding matrix device, where each layer represents a data stream independently transmitted in the spatial domain or beam domain. Generally, there are up to four layers, which are layer 1, layer 2, layer 3 and layer 4.

3. The term "terminal" in the embodiments of the present application represents a communication device that can report the channel state information, including mobile phone, computer, tablet, etc.

4. The term "network side device" in the embodiments of the present application represents a communication device that can receive and decode the channel state information reported by a terminal, including base station, macro base station, etc.

5. The term "Part 1 of CSI" in the embodiments of the present application refers to the section 5.2.3 of the 3GPP (3rd Generation Partnership Project) 38.214 Specification. For the feedback of the Type I and Type II CSI for the PUSCH (Physical Uplink Shared Channel), the CSI report consists of two parts. For the CSI feedback of the Type II codebook, Part 1 has the fixed payload size and contains the RI, CQI (Channel Quality Indicator) and the indication of the quantity of the non-zero wideband amplitude coefficient for each data transmission layer.

6. The term "Part 2 of CSI" in the embodiments of the present application includes the PMI (Precoding matrix Indicator) of the CSI. Parts 1 and 2 are encoded separately, and Part 1 shall be transmitted in its entirety before Part 2 and used to identify the quantity of information bits in Part 2.

The application scenarios described in the embodiments of the present application are intended to illustrate the embodiments of the present application more clearly, and do not constitute a limitation on the solutions provided in the embodiments of the present application. In some embodiments, with the appearance of new application scenarios, the embodiments of the present application are also applicable to similar problems. Here, in the description of the present application, "multiple" means two or more unless otherwise specified.

The Type II codebook is defined in the NR Rel-15. It is based on the mode of linear combination of beams within an orthogonal beams group, and supports the Rank1 and Rank2 codebooks. For a subband, the $$W = \begin{bmatrix} \tilde{w}_{0,0} \\ \tilde{w}_{1,0} \end{bmatrix}.$$

The Rank2 codebook is expressed as:

$$W = \begin{bmatrix} \tilde{w}_{0,0} & \tilde{w}_{0,1} \\ \tilde{w}_{1,0} & \tilde{w}_{1,1} \end{bmatrix}.$$

Here $$\tilde{w}_{r,l} = \sum_{i=0}^{L-1} b_{k_1^{(i)} k_2^{(i)}} \cdot P_{r,l,i}^{(WB)} \cdot P_{r,l,i}^{(SB)} \cdot c_{r,l,i},$$

L represents the quantity of orthogonal beams per group, $b_{k_1,k_2}$ represents orthogonal beams as a 2D DFT (2-Dimensional Discrete Fourier Transform) vector, r=0, 1 represent the first and second polarization directions in a dual-polarized antenna (WB) array, and l=0, 1 the layer index. $P_{r,l,i}^{(WB)}$ represents the wideband beam amplitude scaling factor for beam i (SB) in the beam group and on polarization direction r and layer l. $P_{r,l,i}^{(SB)}$ refers to the subband beam amplitude scaling factor for beam i and on polarization direction r and layer l. $C_{r,l,i}$ represents the beam phase combining coefficient for beam i in the beam group, polarization direction r and layer l. Since the quantity of codebook coefficients when Rank=2 is about twice the quantity of codebook coefficients when Rank=1, the codebook overhead varies greatly when the value of the RI (Rank Indication) varies. When a base station receives the CSI fed back by a terminal, the value of the RI cannot be known before the correct decoding, so the CSI overhead size cannot be determined. In order to prevent the base station from being unable to correctly decode the CSI due to the ambiguity in overhead, the following two-part structure is adopted for reporting the Type II CSI in Rel-15.

Part 1 of CSI includes: RI, wideband CQI for the first codeword, differential CQI corresponding to the first codeword, an indication of the number of zero wideband amplitude coefficients across layer 1 and the number of zero wideband amplitude coefficients across layer 2, as shown in FIG. 1A.

Part 2 of CSI includes: rotation factor, beam information, indication of strongest beam in layer 1, wideband beam amplitude scaling factor for layer 1, indication of strongest beam in layer 2, wideband beam amplitude scaling factor for layer 2, subband phase coefficient and/or subband amplitude coefficient for each even-numbered subband, and subband phase coefficient and/or subband amplitude coefficient for each odd-numbered subband, as shown in FIG. 1B.

Here, the overhead of Part 1 of CSI is fixed and is independent of the value of the RI, and the overhead of Part 2 of CSI can be determined by the decoded result of the Part 1. Therefore, the problem of overhead ambiguity is avoided.

Since the feedback of each subband includes both the subband beam phase combining coefficient and the subband beam amplitude scaling factor, the feedback overhead required to feedback the coefficients of all the subbands is huge when the quantity of subbands is large. The low-overhead Type II codebook is defined in the NR Rel-16, where the coefficients of each subband are compression and the compression coefficients are fed back to the base station. Taking Rank=1 as an example, for all subbands, the codebook can be expressed as:

$$W = W_1 \tilde{W}_2 W_f^H =$$

$$\begin{bmatrix} b_{k_1^{(0)} k_2^{(0)}} & b_{k_1^{(1)} k_2^{(1)}} & \cdots & b_{k_1^{(L-1)} k_2^{(L-1)}} & 0 \\ 0 & & & & b_{k_1^{(0)} k_2^{(0)}} & b_{k_1^{(1)} k_2^{(1)}} & \cdots & b_{k_1^{(L-1)} k_2^{(L-1)}} \end{bmatrix} \cdot$$

$$\begin{bmatrix} p_{0,0} \cdot c_{0,0} & p_{0,1} \cdot c_{0,1} & \cdots & p_{0,M-1} \cdot c_{0,M-1} \\ p_{1,0} \cdot c_{1,0} & p_{1,1} \cdot c_{1,1} & \cdots & p_{1,M-1} \cdot c_{1,M-1} \\ \vdots & & & \vdots \\ p_{2L-1,0} \cdot c_{2L-1,0} & p_{2L-1,1} \cdot c_{2L-1,1} & \cdots & p_{2L-1,M-1} \cdot c_{2L-1,M-1} \end{bmatrix} \cdot$$

$$\begin{bmatrix} f_{0,0} & f_{0,1} & \cdots & f_{0,N-1} \\ f_{1,0} & f_{1,1} & \cdots & f_{1,N-1} \\ \vdots & & & \vdots \\ f_{M-1,0} & f_{M-1,1} & \cdots & f_{M-1,N-1} \end{bmatrix}.$$

Here the orthogonal beams contained in $W_1$ are the same as those in the Type II codebook of Rel-15; $\tilde{W}_2$ represents the compression coefficient, and $P_{i,j}$ represents the amplitude scaling factor, $C_{i,j}$ represents the phase combining coefficient, and the coefficients need to be fed back to the base station. $W_f$ represents the compression base vector which contains M base vectors, the length of each vector is N, and N is determined by the quantity of subbands. The compression coefficients in $\tilde{W}_2$ need to be quantized and then fed back to the base station. Currently, there is no corresponding CSI reporting method for the Rel-16 codebook structure.

Therefore, an embodiment of the present application proposes a CSI reporting method for the codebook structure of Rel-16, which can realize the beam indication, the compression base vector indication and the indication of nonzero coefficients in the compression coefficients of each layer when Rank=3 or 4, and ensure a feedback overhead.

In view of the foregoing scenarios, the embodiments of the present application will be further described in detail below in combination with the accompanying drawings of the specification.

As shown in FIG. 2, in the method for reporting the channel state information in the embodiment of the present application, the system includes: a terminal 10 and a network side device 20.

The terminal 10 is configured to determine the codebook indication information corresponding to a data transmission layer according to the codebook parameter information; and send the CSI containing the codebook indication information to the network side device.

The network side device 20 is configured to receive the CSI containing the codebook indication information corresponding to the data transmission layer reported by the terminal; and determine the precoding matrix of the terminal after decoding the CSI according to the codebook indication information in the CSI.

Here, the codebook indication information includes but is not limited to a part or all of following information:
the beam information for determining orthogonal beams in the precoding matrix, the base vector information for determining compression base vectors in the precoding matrix, and the non-zero coefficient indication information for determining compression coefficients in the precoding matrix.

Through the above solution, the terminal reports the CSI containing the codebook indication information to the network side device after determining the codebook indication information through measurement. The codebook indication information is based on the Rel-16 codebook structure, and includes but not limited to a part or all of following information: beam information, base vector information and non-zero coefficient indication information. The network side device performs the decoding based on the received CSI to determine the precoding matrix of the terminal, so that the network side device can obtain the channel information in time. A CSI reporting method for the Rel-16 codebook structure is proposed, which realizes the reporting of the beam indication, base vector indication or non-zero coefficient position indication in the Type II CSI, and ensures an amount of feedback overhead.

In embodiments of the application, the beam information for determining orthogonal beams in the precoding matrix represents the beam information for one or more data transmission layers; the base vector information for determining compression base vectors in the precoding matrix represents the base vector information for one or more data transmission layers; and the non-zero coefficient indication information for determining compression coefficients in the precoding matrix represents the non-zero coefficient indication information for one or more data transmission layers.

In embodiments of the application, when the terminal determines the codebook indication information corresponding to the data transmission layer according to the codebook parameter information, the codebook parameter information may be predefined by the system or configured by the network side device. The terminal measures and reports the beam information, the base vector information and the non-zero coefficient indication information according to the codebook parameter information, and the codebook parameter information includes candidate codebook parameters, the quantity of codebook parameters for the data transmission layer, and other information.

For example, the first codebook parameter information includes: Rank=2, the quantity of candidate orthogonal beams is J=16, the quantity of candidate base vectors is N=13, the quantity of beams for layer 1 is $L_0$=4, the quantity of base vectors for layer 1 is $M_0$=4, the quantity of non-zero coefficients for layer 1 is $K_0^0$=16; the quantity of beams for layer 2 is $L_1$=4, the quantity of base vectors for layer 2 is $M_1$=2, and the quantity of non-zero coefficients for layer 2 is $K_1^0$=8.

For example, the second codebook parameter information includes: Rank=4, the quantity of candidate orthogonal beams is J=16, the quantity of candidate base vectors is N=13, the quantity of beams for layer 1 and layer 2 is $L_i$=4, the quantity of base vectors for layer 1 and layer 2 is $M_i$=4, the quantity of non-zero coefficients for layer 1 and layer 2 is $K_i^0$=16; and it is assumed that the quantity of beams for layer 3 and layer 4 is $L_j$=2, the quantity of base vectors for layer 3 and layer 4 is $M_j$=4, the quantity non-zero coefficients for layer 3 and layer 4 is $K_j^0$=8.

For example, the third codebook parameter information includes: Rank=2 or 4, the quantity of candidate orthogonal beams is J=16, the quantity of candidate base vectors is N=13, the layer 1, layer 2, layer 3 and layer 4 use the same quantity of beams, the same quantity of base vectors, and the same quantity of reported non-zero coefficients, that is, $L_i$=$L_j$=4, $M_i$=$M_j$=4, and the quantity of non-zero coefficients is $K_i^0$=$K_j^0$=16.

In embodiments of the application, the network side device can determine the codebook parameters for the terminal among the candidate codebook parameters when decoding the received CSI, and the codebook parameters include but are not limited to a part or all of following information:
the orthogonal beams, compression base vectors, and a position of non-zero coefficient.

In embodiments of the application, the codebook indication information includes the beam information for determining orthogonal beams in the precoding matrix, and the terminal determines the beam information in the following ways.

In a first determining way: the terminal takes a bitmap as the beam information corresponding to the data transmission layer.

Here, the bits in the bitmap correspond to the candidate orthogonal beams, and the value on a bit indicates whether the data transmission layer uses the orthogonal beams corresponding to this bit.

In one embodiment, if the beam information is a bitmap, the network side device determines the orthogonal beams for the data transmission layer according to the bits in the bitmap and the values on the bits.

As shown in FIG. 3, the beam information of the layer 1 is represented by bitmap 1, the candidate orthogonal beams set contains J=16 candidate orthogonal beams, and the length of bitmap 1 is J. It is assumed that L=4 beam vectors are selected for the layer 1, and L bits are set to 1 and the others are all 0. The bit value of 1 means that the candidate orthogonal beam corresponding to this bit is used for layer 1, and the bit value of 0 means that the candidate orthogonal beam corresponding to this bit is not used for layer 1. It can be seen from FIG. 3 that the $1^{st}$, $3^{rd}$, $8^{th}$ and $12^{th}$ candidate orthogonal beams among 16 candidate orthogonal beams are used for layer 1.

In one embodiment, in the case that the bitmap is used to represent the beam information, for example, the bitmap is used to represent the beam information of the layer 1, it is assumed that L=4 beam vectors are selected for layer 1, then L bits are set to 0 and the others are all 1. The bit value of 0 means that the candidate orthogonal beam corresponding to this bit is used for layer 1, and the bit value of 1 means that the candidate orthogonal beam corresponding to this bit is not used for layer 1.

In a second determining way: the terminal takes an index set as the beam information corresponding to the data transmission layer.

Here, the index set includes the indexes of the orthogonal beams for the data transmission layer.

In one embodiment, if the beam information is an index set, the network side device determines the orthogonal beams for the data transmission layer according to the indexes in the index set.

The beam information of the layer 1 is indicated by an index set, for example, an index set containing L=4 elements is used for indication, such as {2, 3, 5, 6}. The network side device determines the orthogonal beams with index values of 2, 3, 5 and 6 as 4 orthogonal beams for the layer 1 according to the index values.

In a third determining way: the terminal takes the combination index information as the beam information corresponding to the data transmission layer.

Here, the combination index information has X bits, X is determined according to the quantity of candidate orthogonal beams and the quantity of orthogonal beams for the data transmission layer, and the combination index information indicates the position of combination of orthogonal beams for the data transmission layer in all combinations, where X is an integer.

In one embodiment, if the beam information is the combination index information, the network side device determines the position of combination of orthogonal beams for the data transmission layer in all combinations according to the combination index information and then determines the orthogonal beams for the data transmission layer according to the position.

For example, the quantity X of bits for the combination index information is $$\log_2\binom{J}{L}.$$

When $$\log_2\binom{J}{L}$$

is a decimal, it is rounded up (when it is not a decimal, it needs to be added with 1, for example, $$\log_2\binom{J}{L} = 10.233,$$

then X takes 11), and J is the quantity of candidate orthogonal beams, and L is the quantity of orthogonal beams for the layer 1. Assuming J=16 and L=4, then $$X = \log_2\binom{16}{4} = 10.83$$

(retaining two decimal places), which is rounded up by adding with 1 to be 11, that is, it need to take 11 bits. It is determined by combination that there are a total of 1820 cases when selecting 4 from 16 candidate orthogonal combination beams. Each case can be represented by the 11-bit combination index information. One piece of combination index information indicates one combination. For example, the combination index information is 00000001011, the position of the combination indicated by this index information in all combinations is the twelfth, and then the twelfth combination is determined. It is assumed that the twelfth combination is to select the $1^{st}$, $2^{nd}$, $3^{rd}$ and $16^{th}$ beams among the 16 candidate orthogonal beams, then 4 candidate orthogonal beams for the layer 1 can be determined as the $1^{st}$, $2^{nd}$, $3^{rd}$ and $16^{th}$ beams.

It should be noted that the ways to determine the beam information listed in the embodiments of the present application are only examples, and any way to determine the beam information is applicable to the embodiments of the present application.

In embodiments of the application, the codebook indication information includes the base vector information for determining compression base vectors in the precoding matrix, and the terminal determines the base vector information in the following ways.

In a first determining way: the terminal takes a bitmap as the base vector information corresponding to the data transmission layer.

Here, the bits in the bitmap correspond to the candidate compression base vectors, and the value on a bit indicates whether the data transmission layer uses the compression base vector corresponding to this bit.

In one embodiment, if the base vector information is a bitmap, the network side device determines the compression base vectors for the data transmission layer according to the bits in the bitmap and the values on the bits.

As shown in FIG. 3, the base vector information of the layer 1 is represented by bitmap 1, and the candidate compression base vector set contains N=16 candidate compression base vectors, and the length of bitmap 1 is N. It is assumed that M=4 beam vectors are selected for layer 1, and M bits are set to 1 and the others are all 0. The bit value of 1 means that the candidate compression base vector corresponding to this bit is used for layer 1, and the bit value of 0 means that the candidate compression base vector corresponding to this bit is not used for layer 1. It can be seen from FIG. 3 that the $1^{st}$, $3^{ed}$, $8^{th}$ and $12^{th}$ beams among 16 candidate compression base vectors are used for layer 1.

In one embodiment, when the bitmap is used to represent the base vector information, for example, the bitmap is used to represent the base vector information of the layer 1, it is assumed that M=4 beam vectors are selected for layer 1, then M bits are set to 0 and the others are all 1. The bit value of 0 means that the candidate compression base vector corresponding to this bit is used for layer 1, and the bit value of 1 means that the candidate compression base vector corresponding to this bit is not used for layer 1.

In a second determining way: the terminal takes an index set as the base vector information corresponding to the data transmission layer.

Here, the index set includes the indexes of the compression base vectors for the data transmission layer.

In one embodiment, if the base vector information is an index set, the network side device determines the compression base vectors for the data transmission layer according to the indexes in the index set.

The base vector information of the layer 1 is expressed by means of an index set, for example, an index set containing M=4 elements is used for indication, such as {2, 3, 5, 6}. The network side device determines the compression base vectors with index values of 2, 3, 5 and 6 as 4 compression base vectors for the layer 1 according to the index values.

In a third determining way: the terminal takes the combination index information as the base vector information corresponding to the data transmission layer.

Here, the combination index information has X bits, X is determined according to the quantity of candidate compression base vectors and the quantity of compression base vectors for the data transmission layer, and the combination index information indicates the position of combination of compression base vectors for the data transmission layer in all combinations, where X is an integer.

In one embodiment, if the base vector information is the combination index information, the network side device determines the position of combination of compression base vectors for the data transmission layer in all combinations according to the combination index information and then determines the compression base vectors for the data transmission layer according to the position.

For example, the number X of bits for the combination index information is $$\log_2 \binom{J}{L}.$$

When $$\log_2 \binom{J}{L}$$

is a decimal, it is rounded up (when it is not a decimal, it needs to be added with 1, for example, $$\log_2 \binom{J}{L} = 10.233,$$

then X takes 11), and N is the quantity of candidate compression base vectors, and M is the quantity of compression base vectors for the layer 1. Assuming N=16 and M=4, then $$X = \log_2 \binom{16}{4} = 10.83$$

(retaining two decimal places), which is rounded up by adding with 1 to be 11, that is, it needs be represented by 11 bits. It is determined by combination that there are a total of 1820 cases when selecting 4 compression base vectors from 16 candidate compression base vectors. These cases can be represented by the 11-bit combination index information. One piece of combination index information indicates one combination. For example, the combination index information is 00000001011, the position of the combination indicated by this index information in all combinations is the twelfth, and then the twelfth combination is determined. It is assumed that the twelfth combination is to select the $1^{st}$, $2^{nd}$, $3^{rd}$ and $16^{th}$ compression base vectors among the 16 candidate compression base vectors, then 4 candidate compression base vectors for the layer 1 can be determined as the $1^{st}$, $2^{nd}$, $3^{rd}$ and $16^{th}$ compression base vectors.

It should be noted that the ways to determine the base vector information listed in the embodiments of the present application are only examples, and any way to determine the base vector information is applicable to the embodiments of the present application.

In embodiments of the application, the codebook indication information includes the non-zero coefficient indication information for determining compression coefficients in the precoding matrix, and the terminal determines the non-zero coefficient indication information in the following ways.

In a first determining way: the terminal takes a bitmap as the non-zero coefficient indication information corresponding to the data transmission layer.

Here, the bits in the bitmap correspond to the candidate non-zero coefficient positions, and the value on a bit indicates whether the data transmission layer uses the candidate non-zero coefficient position.

In one embodiment, if the non-zero coefficient indication information is a bitmap, the network side device determines the non-zero coefficient positions for the data transmission layer according to the bits in the bitmap and the values on the bits.

The bitmap as shown in FIG. 7 indicates: a bit with a value of 1 in the figure represents that the position is for a non-zero coefficient, and a bit with a value of 0 in the figure represents that the position is not for a non-zero coefficient (or the position is not a non-zero coefficient position for the data transmission layer corresponding to the bitmap). The quantity of non-zero coefficients can be determined according to the quantity of bits with value of 1.

Alternatively, a bit with the bit value of 0 is used to represent that the position is for a non-zero coefficient, and a bit with the bit value of 1 is used to represent that the position is not for a non-zero coefficient (or the position is not a non-zero coefficient position for the data transmission layer corresponding to the bitmap). The quantity of non-zero coefficients can be determined according to the quantity of bits with the value of 0.

In a second determining way: the terminal takes an index set as the non-zero coefficient indication information corresponding to the data transmission layer.

Here, the index set includes the indexes of the non-zero coefficient positions for the data transmission layer.

In one embodiment, if the non-zero coefficient indication information is an index set, the network side device determines the non-zero coefficient positions for the data transmission layer according to the indexes in the index set.

The base vector information of the layer 1 is represented by means of an index set, for example, it is represented by an index set as {1.1, 1.2, 2.1, 2.2, 2.3, 2.4, 3.2, 4.3, 5.1, 5.3, 5.4, 6.1, 7.1, 7.2, 7.3, 7.4}, and the digit before the decimal point represents the row where the non-zero coefficient is located, and the digit after the decimal point represents the column where the non-zero coefficient is located. For example, 1.1 indicates that the item in the first row and the first column is a non-zero coefficient. The quantity of non-zero coefficients is the quantity of index values in the index set, and the positions of the non-zero coefficients are the positions represented by the index values in the index set.

In a third determining way: the terminal takes the combination index information as the non-zero coefficient indication information corresponding to the data transmission layer.

Here, the combination index information has X bits, X is determined according to the quantity of candidate non-zero coefficient positions and the quantity of non-zero coefficient positions for the data transmission layer, and the combination index information indicates the position of combination of non-zero coefficient positions for the data transmission layer in all combinations, where X is an integer.

In one embodiment, if the non-zero coefficient indication information is the combination index information, the network side device determines the position of combination of non-zero coefficient positions for the data transmission layer in all combinations according to the combination index information and then determines the non-zero coefficient positions for the data transmission layer according to the position.

For example, the number X of bits for the combination index information is $$\log_2\binom{J}{L}.$$

When $$\log_2\binom{J}{L}$$

is a decimal, it is rounded up (when it is not a decimal, it needs to be added with 1, for example, $$\log_2\binom{J}{L} = 10.233,$$

then X takes 11), and J is the quantity of candidate non-zero coefficient positions, and L is the quantity of non-zero coefficient positions for the layer 1. Assuming J=16 and L=4, then $$X = \log_2\binom{16}{4} = 10.83$$

(retaining two decimal places), which is rounded up by adding with 1 to be 11, that is, it needs be represented by 11 bits. It is determined by combination that there are a total of 1820 cases when selecting 4 non-zero coefficient positions from 16 candidate non-zero coefficient positions. These cases can be represented by the 11-bit combination index information. One piece of combination index information indicates one combination. For example, the combination index information is 00000001011, the position of the combination indicated by this index information in all combinations is the twelfth, and then the twelfth combination is determined. Thus the non-zero coefficient positions represented by the twelfth combination are the non-zero coefficient positions for the data transmission layer.

It should be noted that the ways to determine the non-zero coefficient indication information listed in the embodiments of the present application are only examples, and any way to determine the non-zero coefficient indication information is applicable to the embodiments of the present application.

In embodiments of the application, the codebook indication information includes the beam information for determining orthogonal beams in the precoding matrix; if the terminal determines that multiple data transmission layers correspond to the same beam information, the beam information corresponding to the multiple of data transmission layers is placed in the CSI; after determining that one piece beam information corresponds to multiple data transmission layers, the network side device determines the orthogonal beams for the multiple of data transmission layers in the candidate codebook parameters according to this beam information.

In one embodiment, when determining that the beams for a data transmission layer are the same as the beams for other layers or include the beams for other layers according to the instruction pre-defined by the system or the configuration information of the network side device, the terminal determines that multiple data transmission layers correspond to the same beam information, and then the beam information corresponding to one of the data transmission layers can be used as the first beam information. The beam information corresponding to other data transmission layers may not be reported and can be obtained according to the first beam information. In one embodiment the network side device can determine the beams for other data transmission layers according to the instruction pre-defined by the system and the first beam information or according to the configuration information of the network side device and the first beam information.

For example, taking the first codebook parameter information as an example, the beam information of the layer 1 is represented by one piece of beam information. The beam information can be represented by a bitmap with the size of J, the bit with value 1 corresponds to a used beam, and the bit with value 0 corresponds to an unused beam.

Here, the beam information of the layer 1 (the first beam information) is bitmap 1 as shown in FIG. 3: it can be known from bitmap 1 that the first, third, eighth and twelfth beams are used for layer 1.

It is assumed that the system pre-defines that the layer 2 uses all beams of the layer 1, or the beams for the layer 1 contain $L_1$ beams for the layer 2, for example, the layer 2 uses the first $L_1$=4 beams among the beams for the layer 1, that is, the beams for the layer 2 are also the first, third, eighth and twelfth beams. At this time, the terminal determines that the layer 1 and the layer 2 have the same beam information, and only needs to report the beam information for the layer 1, that is, the bitmap 1 corresponds to two data transmission layers of layer 1 and layer 2. If the combination index information is used for indication, the quantity of required bits is $$\log_2\binom{16}{4} = 11$$

bits.

After receiving the CSI reported by the terminal, the network side device determines that the bitmap 1 corresponds to two data transmission layers of layer 1 and layer 2, and then determines the orthogonal beams for the layer 1 and the orthogonal beams for the layer 2 according to the system pre-definition and the bitmap 1.

In one embodiment, if the layer 2 independently selects L1 beams from all candidate orthogonal beams (for example, the orthogonal beams for the layer 2 are different from the orthogonal beams for the layer 1), then the terminal needs to report two pieces of beam information: the beam information bitmap 1 of the layer 1 and the beam information bitmap 2 of the layer 2.

As shown in FIG. 4, the beam information of the layer 2 is represented by bitmap 2, and it can be known from bitmap 2 that the layer 2 uses the second, sixth, seventh and thirteenth beams. If the combination index information is used for indication, the quantity of required bits is $$\log_2\binom{16}{4} = 11$$

bits. The specific operations refer to the first embodiment below.

In embodiments of the application, the codebook indication information includes the base vector information for determining compression base vectors in the precoding matrix; if the terminal determines that multiple data transmission layers correspond to the same base vector information, the base vector information corresponding to the multiple of data transmission layers is placed in the CSI; after determining that one base vector information corresponds to multiple data transmission layers, the network side device determines the compression base vectors for the multiple of data transmission layers in the candidate codebook parameters according to this base vector information.

In one embodiment, when determining that the compression base vectors for a data transmission layer are the same as the compression base vectors for other layers or include the compression base vectors for other layers according to the instruction pre-defined by the system or the configuration information of the network side device, the terminal determines that multiple data transmission layers correspond to the same base vector information, and then the base vector information corresponding to one of the data transmission layers can be used as the first base vector information. The base vector information corresponding to other data transmission layers may not be reported and can be obtained according to the first base vector information. In one embodiment the network side device can determine the compression base vectors for other data transmission layers according to the instruction pre-defined by the system and the first base vector information or according to the configuration information of the network side device and the first base vector information.

For example, taking the first codebook parameter information as an example, the base vector information of the layer 1 is represented by one piece of base vector information. The base vector information can be represented by a bitmap with the size of N, the bit with value 1 corresponds to a used compression base vector, and the bit with value 0 corresponds to an unused compression base vector.

Here, the base vector information of the layer 1 (the first base vector information) is bitmap 3 as shown in FIG. 5: it can be known from bitmap 3 that the layer 1 uses the first, fourth, eighth and twelfth compression base vectors.

It is assumed that the system pre-defines that the compression base vectors for the layer 1 contain $M_1$ compression base vectors for the layer 2, for example, the layer 2 uses the first $M_1=2$ compression base vectors among the compression base vectors for the layer 1, that is, the compression base vectors for the layer 2 are the first and fourth compression base vectors. At this time, the terminal determines that the layer 1 and the layer 2 have the same base vector information, and only needs to report the base vector information for the layer 1, that is, the bitmap 3 corresponds to two data transmission layers of layer 1 and layer 2. If the combination index information is used for indication, the quantity of required bits is $$\log_2\binom{13}{4} = 9.48$$

bits, which is rounded up by adding with 1 to obtain 10 bits.

After receiving the CSI reported by the terminal, the network side device determines that the bitmap 3 corresponds to two data transmission layers of layer 1 and layer 2, and then determines the compression base vectors for the layer 1 and the compression base vectors for the layer 2 according to the system pre-definition and the bitmap 3.

In one embodiment, if the layer 2 independently selects $M_1$ compression base vectors from all candidate compression base vectors (for example, the compression base vectors for the layer 2 are different from the compression base vectors for the layer 1), then the terminal needs to report two pieces of base vector information: the base vector information bitmap 3 of the layer 1 and the base vector information bitmap 4 of the layer 2.

As shown in FIG. 6, the base vector information of the layer 2 is represented by bitmap 4, and it can be known from bitmap 4 that the layer 2 uses the first and fifth base vectors. If the combination index information is used for indication, the quantity of required bits is $$\log_2\binom{13}{2} = 6.29$$

bits, which is rounded up by adding with 1 to obtain 7 bits. The specific operations refer to the first embodiment below. In the following embodiments, the same calculation method is used when determining the combination index information. If the result of taking the logarithm is a decimal, then the value is taken by adding with 1, which will not be listed in details one by one.

In embodiments of the application, the codebook indication information includes the non-zero coefficient indication information for determining compression coefficients in the precoding matrix; if the terminal determines that multiple data transmission layers correspond to the same non-zero coefficient indication information, the non-zero coefficient indication information corresponding to the multiple of data transmission layers is placed in the CSI; after determining that one non-zero coefficient indication information corresponds to multiple data transmission layers, the network side device determines the non-zero coefficient positions for the multiple of data transmission layers in the candidate codebook parameters according to this non-zero coefficient indication information.

In one embodiment, when determining that the non-zero coefficients for a data transmission layer are the same as the non-zero coefficients for other layers or include the non-zero coefficients for other layers according to the instruction pre-defined by the system or the configuration information of the network side device, the terminal determines that multiple data transmission layers correspond to the same non-zero coefficient indication information, and then the non-zero coefficient indication information corresponding to one of the data transmission layers can be used as the first non-zero coefficient indication information. The non-zero coefficient indication information corresponding to other data transmission layers may not be reported and can be obtained according to the first non-zero coefficient indication information. In one embodiment the network side device can determine the non-zero coefficients for other data transmission layers according to the instruction pre-defined by the system and the first non-zero coefficient indication information or according to the configuration information of the network side device and the first non-zero coefficient indication information.

For example, taking the first codebook parameter information as an example, the non-zero coefficient indicator information of the layer 1 is represented by one piece of non-zero coefficient indicator information (the first non-zero coefficient indicator information). As shown in FIG. 7, it can be represented by bitmap 5 with the size of $2L_0 \times M_0$, where the position of 1 in bitmap 5 is for a non-zero coefficient of the layer 1.

Here, the non-zero coefficient indication information of the layer 1 is bitmap 5 as shown in FIG. 7: the position of the non-zero coefficient for the layer 1 can be known from bitmap 5.

It is assumed that the configuration information of the network side device is: the non-zero coefficient positions of the layer 1 and layer 2 are the same, then the terminal determines that the layer 1 and layer 2 have the same non-zero coefficient indication information and only needs to report the non-zero coefficient indication information for the layer 1, that is, the bitmap 5 corresponds to two data transmission layers of layer 1 and layer 2. If the combination index information is used for indication, the quantity of required bits is $$\log_2 \binom{32}{16} = 30$$

bits.

After receiving the CSI reported by the terminal, the network side device determines that the bitmap 5 corresponds to two data transmission layers of layer 1 and layer 2, and then determines the positions of the non-zero coefficients for the layer 1 and the non-zero coefficients for the layer 2 according to the system pre-definition and the bitmap 5.

In one embodiment, if the layer 2 independently uses the bitmap 6 to indicate the positions of non-zero coefficients, then the terminal needs to report two pieces of non-zero coefficient indication information: the non-zero coefficient indication information bitmap 5 of the layer 1 and the non-zero coefficient indication information bitmap 6 of the layer 2.

As shown in FIG. 8, the non-zero coefficient indication information of the layer 2 is represented by bitmap 6, where the position of 1 in the bitmap 6 is for a non-zero coefficient of the layer 2. If the combination index information is used for indication, the quantity of required bits is $$\log_2 \binom{32}{16} = 30$$

bits. The specific operations refer to the first embodiment below.

In embodiments of the application, Part 1 of CSI includes the RI information, and Part 2 includes the CSI information other than that in Part 1, and Part 2 of CSI does not include the RI information.

In embodiments of the application, after determining the codebook indication information corresponding to the data transmission layer according to the codebook parameter information, the terminal also needs to place the codebook indication information in the CSI, and then send the CSI to the network side device. There are many ways for the terminal to place the codebook indication information in the CSI. Several ways will be listed below.

In a first way: the terminal places all the codebook indication information in Part 1 of CSI.

Correspondingly, the network side device determines all the codebook indication information according to Part 1 of CSI.

For example, Rank=2, the terminal places all of the beam information, base vector information and non-zero coefficient indication information of the layer 1 and layer 2 in Part 1 of CSI. As shown in FIG. 9A, the network side device determines the beam information, base vector information and non-zero coefficient indication information according to Part 1 of CSI, and Part 1 of CSI also includes the RI information.

In a second way: the terminal places all the codebook indication information in Part 2 of CSI.

Correspondingly, the network side device determines all the codebook indication information according to Part 2 of CSI.

For example, Rank=2, the terminal places all of the beam information, base vector information and non-zero coefficient indication information of the layer 1 and layer 2 in Part 2 of CSI. As shown in FIG. 9B, the network side device determines the beam information, base vector information and non-zero coefficient indication information according to Part 2 of CSI, and Part 2 of CSI does not include the RI information.

In a third way: the terminal places a part of the codebook indication information in Part 1 of CSI and places the remaining part of the codebook indication information in Part 2 of CSI.

Correspondingly, the network side device determines a part of the codebook indication information according to Part 1 of CSI, and determines the remaining part of the codebook indication information according to Part 2 of CSI.

For example, the codebook indication information includes the beam information, base vector information, and non-zero coefficient indication information, and Rank=4. The terminal can place the beam information and non-zero coefficient indication information of the layer 1 to layer 4 in Part 1 of CSI, and places the base vector information of the layer 1 to layer 4 in Part 2 of CSI. As shown in FIGS. 10A and 10B, FIG. 10A shows Part 1 of CSI, and the layer 1 and the layer 2 have the same beam information and the same information on the quantity of non-zero coefficients, the first beam information represents the beam information of the layer 1 and corresponds to two data transmission layers (namely layer 1 and layer 2), and the first information on the quantity of non-zero coefficients represents the quantity of non-zero coefficients of the layer 1 and corresponds to the layer 1 and layer 2; the layer 3 and the layer 4 have the same beam information and the same information on the quantity of non-zero coefficients, the third beam information represents the beam information of the layer 3 and corresponds to two data transmission layers (namely layer 3 and layer 4), and the third information on the quantity of non-zero coefficients represents the quantity of non-zero coefficients of the layer 3 and corresponds to the layer 3 and layer 4. FIG. 10B shows Part 2 of CSI.

Alternatively, Rank=4, and the terminal places the beam information, base vector information and non-zero coefficient indication information of the layer 1 and layer 2 in Part 1 of CSI and places the beam information, base vector information and non-zero coefficient information of the layer 3 and layer 4 in Part 2 of CSI, as shown in FIGS. 11A and 11B. FIG. 11A shows Part 1 of CSI, and the layer 1 and the layer 2 have the same beam information and the same base vector information, the first beam information represents the beam information of the layer 1 and corresponds to two data transmission layers (namely layer 1 and layer 2), and the first base vector information represents the base vector information of the layer 1 and corresponds to two data transmission layers (namely layer 1 and layer 2); and FIG. 11B shows Part 2 of CSI, and the layer 3 and the layer 4 have the same beam information and the same base vector information, the third beam information represents the beam information of the layer 3 and corresponds to two data transmission layers (namely layer 3 and layer 4), and the third base vector information represents the base vector information of the layer 3 and corresponds to two data transmission layers (namely layer 3 and layer 4).

It should be noted that the ways to place the codebook indication information in the CSI listed in the embodiments of the present application are only examples, and any way to place the codebook indication information in the CSI is applicable to the embodiments of the present application.

In one embodiment, when the codebook indication information includes the non-zero coefficient indication information for determining compression coefficients in the precoding matrix and the terminal places the non-zero coefficient position information in the non-zero coefficient indication information in Part 2 of CSI, the terminal is required to place the information on the quantity of non-zero coefficients in the non-zero coefficient indication information in Part 1 of CSI, so that the network side device determines the compression coefficients for the data transmission layer when decoding the CSI. In one embodiment, the network side device determines the quantity of non-zero coefficients according to the information on the quantity of non-zero coefficients in Part 1 of CSI.

Here, when placing the non-zero coefficient position information in the non-zero coefficient indication information of at least one data transmission layer in Part 2 of CSI, the terminal needs to place the information on the quantity of non-zero coefficients in the non-zero coefficient indication information in Part 1 of CSI, as shown in FIG. 11B, and the non-zero coefficient position information of the layer 3 and layer 4 is located in Part 2 of CSI, the non-zero coefficient position information of the layer 1 and layer 2 is located in Part 1 of CSI, and then the information on the quantity of non-zero coefficients of the layer 1 to layer 4 is placed in Part 1 of CSI, as shown in FIG. 11A.

In one embodiment, if the non-zero coefficient indication information is in the form of bitmap and the non-zero coefficient position information in the non-zero coefficient indication information of at least one data transmission layer is reported in Part 2 of CSI, there is a need to report the quantity of non-zero coefficients of each data transmission layer in Part 1 of CSI or report the total number of non-zero coefficients of all data transmission layers in Part 1 of CSI.

If the non-zero coefficient indication information is in the form of combination index information and the non-zero coefficient position information in the non-zero coefficient indication information of at least one data transmission layer is reported in Part 2 of CSI, there is a need to report the quantity of non-zero coefficients of each data transmission layer in Part 1 of CSI.

In embodiments of the application, the network side device decodes the CSI information according to the codebook indication information.

In one embodiment, the network side device determines the codebook parameters for the data transmission layer in the candidate codebook parameters according to the codebook indication information, and then determines the precoding matrix of the terminal according to the used codebook parameters.

For example, the network side device determines the beams for the data transmission layer in the candidate orthogonal beams according to the beam information in the codebook indication information. The network side device determines the compression base vectors for the data transmission layer in the candidate compression base vectors according to the base vector information. The network side device determines the positions of the non-zero coefficients of the data transmission layer according to the non-zero coefficient indication information, and then the network side device determines the non-zero coefficients for the data transmission layer according to the positions of the non-zero coefficients and then determines the compression coefficients for the data transmission layer according to the positions of the used non-zero coefficients and a bit set corresponding to the non-zero coefficients, and the bit set includes the quantity of bits occupied by the quantized amplitude coefficients of the non-zero coefficients and the quantity of bits occupied by the quantized phase coefficients of the non-zero coefficients.

In embodiments of the application, the non-zero coefficient is a complex number, including a phase coefficient and an amplitude coefficient. It is assumed that the phase coefficient represents the real part and the amplitude coefficient represents the imaginary part. A non-zero coefficient corresponds to a bit set, and the bit set can be predefined by the system or configured by the network side device for the base station. When a non-zero coefficient is decoded, the non-zero coefficient at this position is decoded according to a bit set corresponding to the non-zero coefficient (i.e., containing the quantity of bits occupied by the quantized amplitude coefficient of the non-zero coefficient and the quantity of bits occupied by the quantized phase coefficient of the non-zero coefficient). The compression coefficients of the data transmission layer are determined by decoding all the non-zero coefficients of the data transmission layer.

For example, the coefficient in the first row and the first column (that is, at the upper left one) shown in FIG. 7 is a non-zero coefficient, and a bit set corresponding to this coefficient is $\{2, 3\}$. It can be seen that the quantity of bits occupied by the quantized phase coefficient of the non-zero coefficient is 2 and the quantity of bits occupied by the quantized amplitude coefficient is 3. The non-zero coefficient at the position of the first row and the first column can be determined by decoding the quantized non-zero coefficient. The compression coefficients of the data transmission layer corresponding to the non-zero coefficient indication information shown in FIG. 7 can be determined by decoding all the non-zero coefficients shown in FIG. 7.

In embodiments of the application, the network side device calculates the precoding matrix for the terminal according to the orthogonal beams, compression base vectors and compression coefficients for each layer determined through decoding.

For the Type II codebook with Rank=4, the precoding matrix of the layer 1 and layer 2 is expressed as:

$$W^{(l)} = W_l \tilde{W}_{2,l} W_{f,0}^H =$$

$$\begin{bmatrix} b_{k_1^{(0)}k_2^{(0)}}^{(l)} & b_{k_1^{(1)}k_2^{(1)}}^{(l)} & \cdots & b_{k_1^{(L_l-1)}k_2^{(L_l-1)}}^{(l)} & & & & 0 & \\ & & 0 & & & b_{k_1^{(0)}k_2^{(0)}}^{(l)} & b_{k_1^{(1)}k_2^{(1)}}^{(l)} & \cdots & b_{k_1^{(L_l-1)}k_2^{(L_l-1)}}^{(l)} \end{bmatrix}.$$

$$\begin{bmatrix} p_{0,0}^{(l)} \cdot c_{0,0}^{(l)} & p_{0,1}^{(l)} \cdot c_{0,1}^{(l)} & \cdots & p_{0,M_l-1}^{(l)} \cdot c_{0,M_l-1}^{(l)} \\ p_{1,0}^{(l)} \cdot c_{1,0}^{(l)} & p_{1,1}^{(l)} \cdot c_{1,1}^{(l)} & \cdots & p_{1,M_l-1}^{(l)} \cdot c_{1,M_l-1}^{(l)} \\ \vdots & & & \vdots \\ p_{2L_l-1,0}^{(l)} \cdot c_{2L_l-1,0}^{(l)} & p_{2L_l-1,1}^{(l)} \cdot c_{2L_l-1,1}^{(l)} & \cdots & p_{2L_l-1,M_l-1}^{(l)} \cdot c_{2L_l-1,M_l-1}^{(l)} \end{bmatrix}.$$

$$\begin{bmatrix} f_{0,0}^{(1)} & f_{0,1}^{(1)} & \cdots & f_{0,N-1}^{(1)} \\ f_{1,0}^{(1)} & f_{1,1}^{(1)} & \cdots & f_{1,N-1}^{(1)} \\ \vdots & & & \vdots \\ f_{M_l-1,0}^{(1)} & f_{M_l-1,1}^{(1)} & \cdots & f_{M_l-1,N-1}^{(1)} \end{bmatrix}$$

and l ∈ {0,1} represents the layer 1 and layer 2.

The precoding matrix of the layer 3 and layer 4 is expressed as:

$$W^{(\tilde{l})} = W_{\tilde{l}} \tilde{W}_{2,\tilde{l}} W_{f,0}^H =$$

$$\begin{bmatrix} b_{k_1^{(0)}k_2^{(0)}}^{(\tilde{l})} & b_{k_1^{(1)}k_2^{(1)}}^{(\tilde{l})} & \cdots & b_{k_1^{(L_{\tilde{l}}-1)}k_2^{(L_{\tilde{l}}-1)}}^{(\tilde{l})} & & & & 0 & \\ & & 0 & & & b_{k_1^{(0)}k_2^{(0)}}^{(\tilde{l})} & b_{k_1^{(1)}k_2^{(1)}}^{(\tilde{l})} & \cdots & b_{k_1^{(L_{\tilde{l}}-1)}k_2^{(L_{\tilde{l}}-1)}}^{(\tilde{l})} \end{bmatrix}.$$

$$\begin{bmatrix} p_{0,0}^{(\tilde{l})} \cdot c_{0,0}^{(\tilde{l})} & p_{01}^{(\tilde{l})} \cdot c_{01}^{(\tilde{l})} & \cdots & p_{0,M_{\tilde{l}}-1}^{(\tilde{l})} \cdot c_{0,M_{\tilde{l}}1}^{(\tilde{l})} \\ p_{1,0}^{(\tilde{l})} \cdot c_{1,0}^{(\tilde{l})} & p_{11}^{(\tilde{l})} \cdot c_{11}^{(\tilde{l})} & \cdots & p_{1,M_{\tilde{l}}-1}^{(\tilde{l})} \cdot c_{1,M_{\tilde{l}}-1}^{(\tilde{l})} \\ \vdots & & & \vdots \\ p_{2L_{\tilde{l}}-1,0}^{(\tilde{l})} \cdot c_{2L_{\tilde{l}}-1,0}^{(\tilde{l})} & p_{2L_{\tilde{l}}-1,1}^{(l)} \cdot c_{2L_{\tilde{l}}-1,1}^{(\tilde{l})} & \cdots & p_{2L_{\tilde{l}}-1,M_{\tilde{l}}-1}^{(\tilde{l})} \cdot c_{2L_{\tilde{l}}-1,M_{\tilde{l}}-1}^{(\tilde{l})} \end{bmatrix}.$$

$$\begin{bmatrix} f_{0,0}^{(\tilde{l})} & f_{0,1}^{(\tilde{l})} & \cdots & f_{0,N-1}^{(\tilde{l})} \\ f_{1,0}^{(\tilde{l})} & f_{1,1}^{(\tilde{l})} & \cdots & f_{1,N-1}^{(\tilde{l})} \\ \vdots & & & \vdots \\ f_{M_{\tilde{l}}-1,0}^{(\tilde{l})} & f_{M_{\tilde{l}}-1,1}^{(\tilde{l})} & \cdots & f_{M_{\tilde{l}}-1,N-1}^{(\tilde{l})} \end{bmatrix}$$

and $\tilde{l} \in \{2,3\}$ represents the layer 3 and layer 4.

In addition, $L_l$ and $M_l$ represent the quantity of beams and the quantity of compression base vectors for the layer 1 and layer 2, respectively, $L_{\tilde{l}}$ and $M_{\tilde{l}}$ represent the quantity of beams and the quantity of compression base vectors for the layer 3 and layer 4, respectively. $\tilde{W}_{2,l}$ and $\tilde{W}_{2,\tilde{l}}$ are $2L_l \times M_l$-dimensional and $2L_{\tilde{l}} \times M_{\tilde{l}}$-dimensional matrices, respectively.

The detailed examples of the indication mode of the codebook indication information including the beam information, the base vector information and the non-zero coefficient indication information will be given below.

Embodiment 1: the codebook parameter information is the first codebook parameter information, and there are two data transmission layers: layer 1 and layer 2. The beam information, base vector information and non-zero coefficient indication information of the layer 1 and layer 2 can be reported in the following ways to indicate the beams, the base vectors, and the number and positions of non-zero coefficients for the terminal, which can be represented by a bitmap or an index set or the combination index information.

(1) For the layer 1, the beam information of the layer 1 is represented by one kind of beam information.

If a bitmap is used, it is assumed that the bit with value 1 corresponds to a beam for the layer 1. As shown in FIG. 3, the beam information of the layer 1 is represented by bitmap 1, and it can be known from bitmap 1 that the layer 1 uses the first, third, eighth and twelfth beams.

If an index set is used, it is expressed as {1, 3, 8, 12}.

If the combination index information is used for indication, the quantity of required bits is $$\log_2 \binom{16}{4} = 11$$

bits.

In the above-mentioned indication way, 11 bits are required for indication through the combination index information, and 16 bits are required for indication through the bitmap. It may be more cost-effective to indicate through the combination index information.

For the layer 2, if the layer 1 and layer 2 have the same beam information, the terminal can report one piece of beam information, i.e., the beam information of the layer 1 (or can report two pieces of beam information).

If the layer 2 independently selects L1 beams from all candidate orthogonal beams: the second, sixth, seventh and thirteenth beams, the terminal reports two pieces of beam information.

If a bitmap is used, it is assumed that the bit with value 1 corresponds to a beam for the layer 2. As shown in FIG. 4, the beam information of the layer 2 is represented by bitmap 2, and it can be known from bitmap 2 that the layer 2 uses the second, sixth, seventh and thirteenth beams.

If an index set is used, it is expressed as {2, 6, 7, 13}.

If the combination index information is used for indication, the quantity of required bits is $$\log_2\binom{16}{4} = 11$$

bits.

(2) For the layer 1, the base vector information of the layer 1 is represented by one kind of base vector information.

If a bitmap is used, the bit with value 1 corresponds to a base vector for layer 1. As shown in FIG. 5, the base vectors for the layer 1 are indicated by bitmap 3, and it can be known from bitmap 3 that the layer 1 uses first, fourth, eighth and twelfth base vectors.

If an index set is used, it is expressed as {1, 4, 8, 12}.

If the combination index information is used for indication, the quantity of required bits is $$\log_2\binom{13}{4} = 10$$

bits.

For the layer 2, if the layer 1 and layer 2 have the same base vector information, the terminal can report one piece of base vector information, i.e., the base vector information of the layer 1 (or can report two pieces of base vector information).

If the layer 2 independently selects $M_1$ base vectors from all candidate compression base vectors: the first and fifth beams, then the terminal reports two pieces of base vector information.

If a bitmap is used, the bit with value 1 corresponds to a base vector for the layer 2. As shown in FIG. 6, the base vectors for the layer 2 are indicated by bitmap 4, and it can be known from bitmap 4 that the layer 2 uses first, and fifth base vectors.

If an index set is used, it is expressed as {1, 5}.

If the combination index information is used for indication, the quantity of required bits is $$\log_2\binom{13}{2} = 7$$

bits.

(3) For the layer 1, the non-zero coefficient indicator information of the layer 1 is represented by one kind of non-zero coefficient indicator information.

If a bitmap of which the size is $2L_0 \times M_0$ is used, the bit value of 1 indicates that the corresponding position is a non-zero coefficient of the layer 1, the quantity of non-zero coefficients is the quantity of bits with the bit value of 1, and the positions of the non-zero coefficients are bits where the bit value of 1 is located, as shown in FIG. 7.

If an index set is used, it is represented as {1.1, 1.2, 2.1, 2.2, 2.3, 2.4, 3.2, 4.3, 5.1, 5.3, 5.4, 6.1, 7.1, 7.2, 7.3, 7.4}, and the digit before the decimal point represents the row where the non-zero coefficient is located, and the digit after the decimal point represents the column where the non-zero coefficient is located. For example, 1.1 indicates that the item in the first row and the first column is a non-zero coefficient. The quantity of non-zero coefficients is the quantity of index values in the index set, and the positions of the non-zero coefficients are the positions represented by the index values in the index set.

If the combination index information is used for indication, the quantity of required bits is $$\log_2\binom{32}{16} = 30$$

bits.

For the layer 2, if the layer 1 and layer 2 have the same non-zero coefficient indication information, the terminal can report one piece of non-zero coefficient indication information, i.e., the non-zero coefficient indication information of the layer 1 (or can report two pieces of non-zero coefficient indication information).

If the quantity of non-zero coefficients of the layer 2 is different from the quantity of non-zero coefficients of the layer 1, or the positions of non-zero coefficients of the layer 2 are different from the positions of non-zero coefficients of the layer 1, the terminal reports two pieces of non-zero coefficient indication information.

Assuming that the layer 2 and layer 1 have the same number of non-zero coefficients but the positions thereof are different, If a bitmap is used of which the size is $2L_1 \times M_1$, the bit value of 1 indicates that the corresponding position is a non-zero coefficient of the layer 2, as shown in FIG. 8.

If an index set is used, it is expressed as {1.2, 2.1, 2.2, 2.3, 2.4, 3.2, 4.3, 5.1, 5.2, 5.3, 5.4, 6.1, 7.1, 7.2, 7.3, 7.4}.

If the combination index information is used for indication, the quantity of required bits is $$\log_2\binom{32}{16} = 30$$

bits.

Embodiment 2: the codebook parameter information is the second codebook parameter information, and there are four data transmission layers: layer 1, layer 2, layer 3, layer 4. The beam information, base vector information and non-zero coefficient indication information of these four data transmission layers can be reported in the following ways to indicate the beams, the base vectors, and the number and positions of non-zero coefficients for the terminal. It is assumed that the system predefines: the layer 1 and layer 2 have the same beam information, the same base vector information, the same information on the quantity of non-zero coefficients and different non-zero coefficient position information, and the layer 3 and layer 4 have the same beam information, the same base vector information, the same information on the quantity of non-zero coefficients and different non-zero coefficient position information, which can be represented by a bitmap or an index set or the combination index information.

(1) For the layer 1 and layer 2, the beam information of the layer 1 and layer 2 is represented by one kind of beam information.

If a bitmap is used, it is assumed that the bit with value 1 corresponds to a beam for the layer 1 and layer 2 (assuming that the system predefines that the layer 1 and layer 2 use the same beams). As shown in FIG. 12, the beam information of the layer 1 and layer 2 is represented by bitmap 7, and it can be known from bitmap 7 and the system pre-definition that the layer 1 and layer 2 use the second, third, eighth and twelfth beams.

If an index set is used, it is expressed as {2, 3, 8, 12}.

If the combination index information is used for indication, the quantity of required bits is $$\log_2\binom{16}{4} = 11$$

bits.

For the layer 3 and layer 4, if the beam information of the layer 3 and layer 4 is the same as the beam information of the layer 1 and layer 2 (the system predefines that the beams for the layer 3 and layer 4 are the beams for the layer 1 and layer 2, or the beams for the layer 3 and layer 4 are $L_{\bar{j}}$ beams among the beams for the layer 1 and layer 2), the terminal can report one piece of beam information, i.e., the beam information of the layer 1 (or can report two, three or four pieces of beam information).

If the layer 3 and layer 4 independently select $L_{\bar{j}}$ beams from all candidate orthogonal beams: the second and sixth beams, the terminal will report two pieces of beam information (the beam information of the layer 1 and layer 2, and the beam information of the layer 3 and layer 4).

If a bitmap is used, it is assumed that the bit with value 1 corresponds to a beam for the layer 3 and layer 4 (assuming that the system predefines that the layer 3 and layer 4 use the same beams). As shown in FIG. 13, the beam information of the layer 3 and layer 4 is represented by bitmap 8, and it can be known from bitmap 8 that the layer 3 and layer 4 use the second and sixth beams.

If an index set is used, it is expressed as {2, 6}.

If the combination index information is used for indication, the quantity of required bits is $$\log_2\binom{16}{2} = 7$$

bits.

(2) For the layer 1 and layer 2, the base vector information of the layer 1 and layer 2 is represented by one kind of base vector information.

If a bitmap is used, the bit with value 1 corresponds to a base vector for layer 1 and layer 2. As shown in FIG. 14, the base vectors for the layer 1 are indicated by bitmap 9, and it can be known from bitmap 9 and the system pre-definition (the layer 1 and layer 2 use the same base vectors) that the layer 1 and layer 2 use first, fourth, twelfth and thirteenth base vectors.

If an index set is used, it is expressed as {1, 4, 12, 13}.

If the combination index information is used for indication, the quantity of required bits is $$\log_2\binom{13}{4} = 10$$

bits.

For the layer 3 and layer 4, if the base vector information of the layer 3 and layer 4 is the same as the base vector information of the layer 1 and layer 2 (the system predefines that the base vectors for the layer 3 and layer 4 are the base vectors for the layer 1 and layer 2, or the base vectors for the layer 3 and layer 4 are $M_{\bar{j}}$ base vectors among the base vectors for the layer 1 and layer 2), the terminal can report one base vector information, i.e., the base vector information of the layer 1 (or can report two, three or four pieces of base vector information).

If the layer 3 and layer 4 independently select M base vectors from all candidate orthogonal combined base vectors: first, fifth, eleventh and twelfth base vectors, the terminal will report two pieces of base vector information (the base vector information of the layer 1 and layer 2, and the base vector information of the layer 3 and layer 4).

If a bitmap is used, it is assumed that the bit value of 1 is used to indicate that the corresponding position is a base vector for the layer 3 and layer 4 (assuming that the system predefines that the layer 3 and layer 4 use the same base vectors). As shown in FIG. 15A, the base vector information of the layer 3 and layer 4 is represented by bitmap 10, and it can be known from bitmap 10 that the layer 3 and layer 4 use the first, fifth, eleventh and twelfth base vectors.

If an index set is used, it is expressed as {1, 5, 11, 12}.

If the combination index information is used for indication, the quantity of required bits is $$\log_2\binom{13}{4} = 10$$

bits.

(3) Four pieces of non-zero coefficient indication information are used to indicate the non-zero coefficients of the layer 1, layer 2, layer 3 and layer 4 respectively.

For the layer 1, if a bitmap is used of which the size is $2L_{\bar{i}} \times M_{\bar{i}}$, the bit value of 1 indicates that the corresponding position is a non-zero coefficient of the layer 1, the quantity of non-zero coefficients is the quantity of bits with the bit value of 1, and the positions of the non-zero coefficients are bits where the bit value of 1 is located, as in bitmap 5 shown in FIG. 7.

If an index set is used, it is expressed as {1.1, 1.2, 2.1, 2.2, 2.3, 2.4, 3.2, 4.3, 5.1, 5.3, 5.4, 6.1, 7.1, 7.2, 7.3, 7.4}.

If the combination index information is used for indication, the quantity of required bits is $$\log_2\binom{32}{16} = 30$$

bits.

For the layer 2, if a bitmap is used of which the size is $2L_i \times M_i$, the bit value of 1 indicates that the corresponding position is a non-zero coefficient of the layer 2, the quantity of non-zero coefficients is the quantity of bits with the bit value of 1, and the positions of the non-zero coefficients are bits where the bit value of 1 is located, as in bitmap 6 shown in FIG. 8.

If an index set is used, it is expressed as {1.2, 2.1, 2.2, 2.3, 2.4, 3.2, 4.3, 5.1, 5.2, 5.3, 5.4, 6.1, 7.1, 7.2, 7.3, 7.4}.

If the combination index information is used for indication, the quantity of required bits is $$\log_2 \binom{32}{16} = 30$$

bits.

For the layer 3, if a bitmap is used, i.e., bitmap 11 as shown in FIG. 16, the bit value of 1 indicates that the corresponding position is a non-zero coefficient of the layer 3, the quantity of non-zero coefficients is the quantity of bits with the bit value of 1, and the positions of the non-zero coefficients are bits where the bit value of 1 is located.

If an index set is used, it is expressed as {1.1, 1.3, 1.4, 2.3, 3.1, 3.2, 4.3, 4.4}.

If the combination index information is used for indication, the quantity of required bits is $$\log_2 \binom{16}{8} = 14$$

bits.

For the layer 4, if a bitmap is used, i.e., bitmap 12 as shown in FIG. 17, the bit value of 1 indicates that the corresponding position is a non-zero coefficient of the layer 4, the quantity of non-zero coefficients is the quantity of bits with the bit value of 1, and the positions of the non-zero coefficients are bits where the bit value of 1 is located.

If an index set is used, it is expressed as {1.2, 1.3, 1.4, 2.3, 3.1, 3.2, 4.3, 4.4}.

If the combination index information is used for indication, the quantity of required bits is $$\log_2 \binom{16}{8} = 14$$

bits.

Embodiment 3: the codebook parameter information is the second codebook parameter information, and there are four data transmission layers: layer 1, layer 2, layer 3, layer 4. The beam information, base vector information and non-zero coefficient indication information of these four data transmission layers can be reported in the following ways to indicate the beams, the base vectors, and the quantity and positions of non-zero coefficients for the terminal. It is assumed that the system predefines: the layer 1 and layer 2 have the same beam information and the same non-zero coefficient position information, and the layer 3 and layer 4 have the same beam information and the same non-zero coefficient position information, which can be represented by a bitmap or an index set or the combination index information.

(1) The indication way of the beam information of the layer 1 to layer 4 is the same as that in the Embodiment 2.

(2) Four pieces of base vector information are used to represent the base vectors used in the layer 1, layer 2, layer 3 and layer 4 respectively.

For the layer 1, if a bitmap is used, the bit with value 1 corresponds to a base vector for layer 1. As shown in FIG. 5, the base vectors for the layer 1 are indicated by bitmap 3, and it can be known from bitmap 3 that the layer 1 uses first, fourth, eighth and twelfth base vectors.

If an index set is used, it is expressed as {1, 4, 8, 12}.

If the combination index information is used for indication, the quantity of required bits is $$\log_2 \binom{13}{4} = 10$$

bits.

For the layer 2, if a bitmap is used, it is assumed that the bit value of 1 is used to indicate that the corresponding position is a base vector for the layer 2. As shown in FIG. 14, the base vectors for the layer 2 are indicated by bitmap 9, and it can be known from bitmap 9 that the layer 2 uses first, fourth, twelfth and thirteenth base vectors.

If an index set is used, it is expressed as {1, 4, 12, 13}.

If the combination index information is used for indication, the quantity of required bits is $$\log_2 \binom{13}{4} = 10$$

bits.

For the layer 3, if a bitmap is used, it is assumed that the bit value of 1 is used to indicate that the corresponding position is a base vector for the layer 3. As shown in FIG. 15A, the base vectors for the layer 3 are indicated by bitmap 10, and it can be known from bitmap 10 that the layer 3 uses the second, fourth, eighth and twelfth base vectors.

If an index set is used, it is expressed as {2, 4, 8, 12}.

If the combination index information is used for indication, the quantity of required bits is $$\log_2 \binom{13}{4} = 10$$

bits.

For the layer 4, if a bitmap is used, it is assumed that the bit value of 1 is used to indicate that the corresponding position is a base vector for the layer 4. As shown in FIG. 15B, the base vectors for the layer 3 are indicated by bitmap 10, and it can be known from bitmap 13 that the layer 3 uses the second, fourth, eighth and twelfth base vectors.

If an index set is used, it is expressed as {2, 4, 8, 12}.

If the combination index information is used for indication, the quantity of required bits is $$\log_2 \binom{13}{4} = 10$$

bits.

(3) For the layer 1 and layer 2, it is represented by one piece of non-zero coefficient indication information, which is the same as the non-zero coefficient indication of the layer 1 in the Embodiment 2.

For the layer 3 and layer 4, it is represented by one piece of non-zero coefficient indication information, which is the same as the non-zero coefficient indication of the layer 3 in the Embodiment 2.

Embodiment 4: the codebook parameter information is the third codebook parameter information. The layer 1, layer 2, layer 3 and layer 4 use the same number of beams and the same number of base vectors, and report the same number of non-zero coefficients, that is, $L_i=L_j=4$, $M_i=M_j=4$, and the quantity of non-zero coefficients is $K_i^0=K_j^0=16$ The beam information, base vector information and non-zero coefficient indication information of each layer can be reported in the following ways to indicate the beams, the base vectors, and the positions of non-zero coefficients for the terminal.

In a first indication way: according to the system pre-definition, one piece of beam information, base vector information and non-zero coefficient indication information are used to indicate the beams, the base vector information, and the positions of non-zero coefficients for the layer 1, layer 2, layer 3 and layer 4. The indication method is same as that described in embodiment 1.

In a second indication way: according to the system pre-definition, one piece of beam information and base vector information are used to indicate the beams and base vector information for the layer 1, layer 2, layer 3 and layer 4. The indication method is same as that described in Example 1. Two pieces of non-zero coefficient indication information are used to indicate the positions of the non-zero coefficients of the layers 1 and 2, and the layers 3 and 4 respectively. The indication method is the same as that described in Example 3. Or, four pieces of non-zero coefficient indication information are used to indicate the positions of the non-zero coefficients of the layers 1, 2, 3 and 4 respectively. The indication method is the same as that described in Embodiment 3.

In a third indication way: according to the system pre-definition, one piece of beam information is used to indicate the beams for the layer 1, layer 2, layer 3 and layer 4. The indication method is same as that described in Example 1. Two pieces of base vector information are used to indicate the base vectors for the layers 1 and 2 and the layers 3 and 4 respectively. The indication method is same as that described in Example 2. Or, four pieces of base vector information are used to indicate the base vectors for the layers 1, 2, 3 and 4 respectively. The indication method is same as that described in Example 3.

The foregoing embodiments are only examples and cannot be exhaustively listed. Any way to indicate the codebook indication information through the bitmap, index set or combination index information is applicable to the embodiments of the present application.

As shown in FIG. 18, embodiments of the present application provide a method for reporting channel state information, which includes the following steps.

Step 1800: a terminal determines the codebook indication information corresponding to a data transmission layer according to the codebook parameter information.

Step 1801: the terminal sends the CSI containing the codebook indication information to a network side device.

Here, the codebook indication information includes apart or all of following information:
the beam information for determining orthogonal beams in a precoding matrix, the base vector information for determining compression base vectors in the precoding matrix, and the non-zero coefficient indication information for determining compression coefficients in the precoding matrix.

In one embodiment, the codebook indication information includes the beam information for determining orthogonal beams in the precoding matrix;
after the terminal determines the codebook indication information corresponding to the data transmission layer according to the codebook parameter information, and before sending the CSI containing the codebook indication information to the network side device, the method includes:
if it is determined that multiple data transmission layers correspond to the same beam information, the terminal places the beam information corresponding to the multiple of data transmission layers in the CSI.

In one embodiment, the codebook indication information includes the base vector information for determining compression base vectors in the precoding matrix;
after the terminal determines the codebook indication information corresponding to the data transmission layer according to the codebook parameter information, and before sending the CSI containing the codebook indication information to the network side device, the method includes:
if it is determined that multiple data transmission layers correspond to the same base vector information, the terminal places the base vector information corresponding to the multiple of data transmission layers in the CSI.

In one embodiment, the codebook indication information includes the non-zero coefficient indication information for determining compression coefficients in the precoding matrix; after the terminal determines the codebook indication information corresponding to the data transmission layer according to the codebook parameter information, and before sending the CSI containing the codebook indication information to the network side device, the method includes:
if it is determined that multiple data transmission layers correspond to the same non-zero coefficient indication information, the terminal places the non-zero coefficient indication information corresponding to the multiple of data transmission layers in the CSI.

In one embodiment, the codebook indication information includes the beam information for determining orthogonal beams in the precoding matrix, and the terminal determines the beam information by:
the terminal takes a bitmap as the beam information corresponding to the data transmission layer, and bits in the bitmap correspond to candidate orthogonal beams, and a value of each bit indicates whether the data transmission layer uses an orthogonal beam corresponding to each bit; or
the terminal takes an index set as the beam information corresponding to the data transmission layer, and the index set includes indexes of orthogonal beams for the data transmission layer; or
the terminal takes the combination index information as the codebook indication information corresponding to the data transmission layer, and the combination index information has X bits, X is determined according to the quantity of candidate orthogonal beams and the quantity of orthogonal beams for the data transmission layer, and the combination index information indicates a position of combination of codebook parameters for the data transmission layer in all combinations of candidate codebook parameters.

The codebook indication information includes the base vector information for determining compression base vectors in the precoding matrix, and the terminal determines the base vector information by:
- the terminal takes a bitmap as the base vector information corresponding to the data transmission layer, and bits in the bitmap correspond to candidate compression base vectors, and a value on each bit indicates whether the data transmission layer uses a compression base vector corresponding to each bit; or
- the terminal takes an index set as the base vector information corresponding to the data transmission layer, and the index set includes indexes of compression base vectors for the data transmission layer; or
- the terminal takes the combination index information as the base vector information corresponding to the data transmission layer, and the combination index information has X bits, X is determined according to the quantity of candidate compression base vectors and the quantity of compression base vectors for the data transmission layer, and the combination index information indicates a position of combination of compression base vectors for the data transmission layer in all combinations of candidate compression base vectors.

The codebook indication information includes the non-zero coefficient indication information for determining compression coefficients in the precoding matrix, and the terminal determines the non-zero coefficient indication information by:
- the terminal takes a bitmap as the non-zero coefficient indication information corresponding to the data transmission layer, and bits in the bitmap correspond to candidate non-zero coefficient positions, and a value on each bit indicates whether the data transmission layer uses a non-zero coefficient position corresponding to each bit; or
- the terminal takes an index set as the non-zero coefficient indication information corresponding to the data transmission layer, and the index set includes indexes of non-zero coefficient positions for the data transmission layer; or
- the terminal takes the combination index information as the non-zero coefficient indication information corresponding to the data transmission layer, and the combination index information has X bits, X is determined according to the quantity of candidate non-zero coefficient positions and the quantity of non-zero coefficient positions for the data transmission layer, and the combination index information indicates a position of combination of non-zero coefficient positions for the data transmission layer in all combinations of candidate non-zero coefficient positions.

In one embodiment, if the codebook indication information includes the non-zero coefficient indication information for determining compression coefficients in the precoding matrix, and the terminal places non-zero coefficient position information in the non-zero coefficient indication information in a second part of the CSI;
the method includes:
the terminal places the information on the quantity of non-zero coefficients in the non-zero coefficient indication information in a first part of the CSI.

In one embodiment, after the terminal determines the codebook indication information corresponding to the data transmission layer according to the codebook parameter information, and before sending the CSI containing the codebook indication information to the network side device, the method includes:
- the terminal places all of the codebook indication information in a first part or a second part of the CSI; or
- the terminal places a part of the codebook indication information in a first part of the CSI, and a remaining part in a second part of the CSI.

Figure 19:
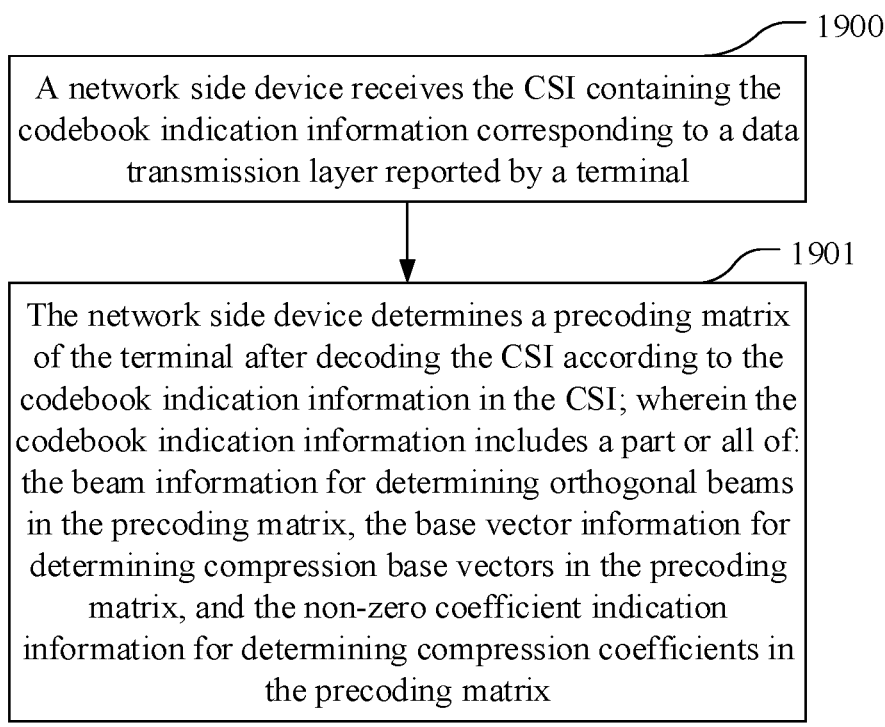
FIG. 19 is a schematic diagram of a second method for reporting the channel state information provided by embodiments of the present application.

As shown in FIG. 19, embodiments of the present application provide a method for reporting channel state information, which includes the following steps.

Step 1900: a network side device receives the CSI containing the codebook indication information corresponding to a data transmission layer reported by a terminal.

Step 1901: the network side device determines a precoding matrix of the terminal after decoding the CSI according to the codebook indication information in the CSI.

Here, the codebook indication information includes a part or all of following information:
the beam information for determining orthogonal beams in the precoding matrix, the base vector information for determining compression base vectors in the precoding matrix, and the non-zero coefficient indication information for determining compression coefficients in the precoding matrix.

In one embodiment, the codebook indication information includes the beam information for determining orthogonal beams in the precoding matrix; and the step in which the network side device decodes the CSI according to the codebook indication information in the CSI includes:
the network side device determines orthogonal beams for multiple data transmission layers in candidate orthogonal beams according to beam information corresponding to the multiple of data transmission layers, if the network side device determines that the beam information in the CSI corresponds to the multiple of data transmission layers.

In one embodiment, the codebook indication information includes the base vector information for determining compression base vectors in the precoding matrix; and the step in which the network side device decodes the CSI according to the codebook indication information in the CSI includes:
the network side device determines compression base vectors for multiple data transmission layers in candidate compression base vectors according to base vector information corresponding to the multiple of data transmission layers, if the network side device determines that the base vector information in the CSI corresponds to the multiple of data transmission layers.

In one embodiment, the codebook indication information includes the non-zero coefficient indication information for determining compression coefficients in the precoding matrix; and the step in which the network side device decodes the CSI according to the codebook indication information in the CSI includes:
the network side device determines positions of non-zero coefficients in compression coefficients for multiple data transmission layers in candidate non-zero coefficient positions according to non-zero coefficient indication information corresponding to the multiple of data transmission layers, if the network side device determines that non-zero coefficient indication information in the CSI corresponds to the multiple of data transmission layers.

In one embodiment, the codebook indication information includes the beam information for determining orthogonal beams in the precoding matrix; and the step in which the network side device decodes the CSI according to the codebook indication information in the CSI includes:

if the beam information is a bitmap, the network side device determines orthogonal beams for the data transmission layer according to bits in the bitmap and values on the bits, and the bits in the bitmap correspond to candidate orthogonal beams, and the a value of each bit indicates whether the data transmission layer uses an orthogonal beam corresponding to each bit; or if the beam information is an index set, the network side device determines orthogonal beams for the data transmission layer according to indexes in the index set, and the index set includes indexes of orthogonal beams for the data transmission layer; or if the beam information is combination index information, the network side device determines the position of combination of orthogonal beams for the data transmission layer in all combinations of candidate orthogonal beams according to the combination index information and then the orthogonal beams for the data transmission layer according to the position, and the combination index information has X bits, X is determined according to the quantity of the candidate orthogonal beams and the quantity of orthogonal beams for the data transmission layer, and the combination index information indicates the position of combination of orthogonal beams for the data transmission layer in all combinations of candidate orthogonal beams.

The codebook indication information includes the base vector information for determining compression base vectors in the precoding matrix; and the step in which the network side device decodes the CSI according to the codebook indication information in the CSI includes:

if the base vector information is a bitmap, the network side device determines compression base vectors for the data transmission layer according to bits in the bitmap and values on the bits, and the bits in the bitmap correspond to candidate compression base vectors, and a value on each bit indicates whether the data transmission layer uses a compression base vector corresponding to each bit; or if the base vector information is an index set, the network side device determines compression base vectors for the data transmission layer according to indexes in the index set, and the index set includes indexes of compression base vectors for the data transmission layer; or if the base vector information is combination index information, the network side device determines the position of combination of compression base vectors for the data transmission layer in all combinations of candidate compression base vectors according to the combination index information and then the compression base vectors for the data transmission layer according to the position, and the combination index information has X bits, X is determined according to the quantity of candidate compression base vectors and the quantity of compression base vectors for the data transmission layer, and the combination index information indicates the position of combination of compression base vectors for the data transmission layer in all combinations of candidate compression base vectors.

The codebook indication information includes the non-zero coefficient indication information for determining compression coefficients in the precoding matrix; and the step in which the network side device decodes the CSI according to the codebook indication information in the CSI includes:

if the non-zero coefficient indication information is a bitmap, the network side device determines non-zero coefficient positions for the data transmission layer according to bits in the bitmap and values on the bits, and the bits in the bitmap correspond to candidate non-zero coefficient positions, and a value on each bit indicates whether the data transmission layer uses a non-zero coefficient position corresponding to each bit; or if the non-zero coefficient indication information is an index set, the network side device determines non-zero coefficient positions for the data transmission layer according to indexes in the index set, and the index set includes indexes of non-zero coefficient positions for the data transmission layer; or if the non-zero coefficient indication information is combination index information, the network side device determines the position of combination of non-zero coefficient positions for the data transmission layer in all combinations of candidate non-zero coefficient positions according to the combination index information and then the non-zero coefficient positions for the data transmission layer according to the position, and the combination index information has X bits, X is determined according to the quantity of the candidate non-zero coefficient positions and the quantity of non-zero coefficient positions for the data transmission layer, and the combination index information indicates the position of combination of non-zero coefficient positions for the data transmission layer in all combinations of the candidate non-zero coefficient positions.

In one embodiment, the codebook indication information includes the non-zero coefficient indication information for determining compression coefficients in the precoding matrix; and the step in which the network side device determines precoding matrix of the terminal after decoding the CSI according to the codebook indication information in the CSI includes:

the network side device determines compression coefficients for the data transmission layer according to non-zero coefficient positions for the data transmission layer and a bit set corresponding to candidate non-zero coefficient positions, and the bit set includes the quantity of bits occupied by quantized amplitude coefficients of the candidate non-zero coefficient positions and the quantity of bits occupied by quantized phase coefficients of the candidate non-zero coefficient positions.

In one embodiment, the codebook indication information includes the non-zero coefficient indication information for determining compression coefficients in the precoding matrix, and the position information in the non-zero coefficient indication information is located in a second part of the CSI;

the method includes:

the network side device determines the quantity of non-zero coefficients according to the information on the quantity of non-zero coefficients in a first part of the CSI or the configuration information of the network side device or the system pre-definition.

In one embodiment, after the network side device receives the CSI containing the codebook indication information corresponding to the data transmission layer reported by the terminal, and before the network side device determines the precoding matrix of the terminal after decoding the CSI according to the codebook indication information in the CSI, the method includes:

the network side device determines all of the codebook indication information according to a first part or a second part of the CSI; or the network side device determines a part of the codebook indication information according to a first part of the CSI and a remaining part of the codebook indication information according to a second part of the CSI.

Figure 20:
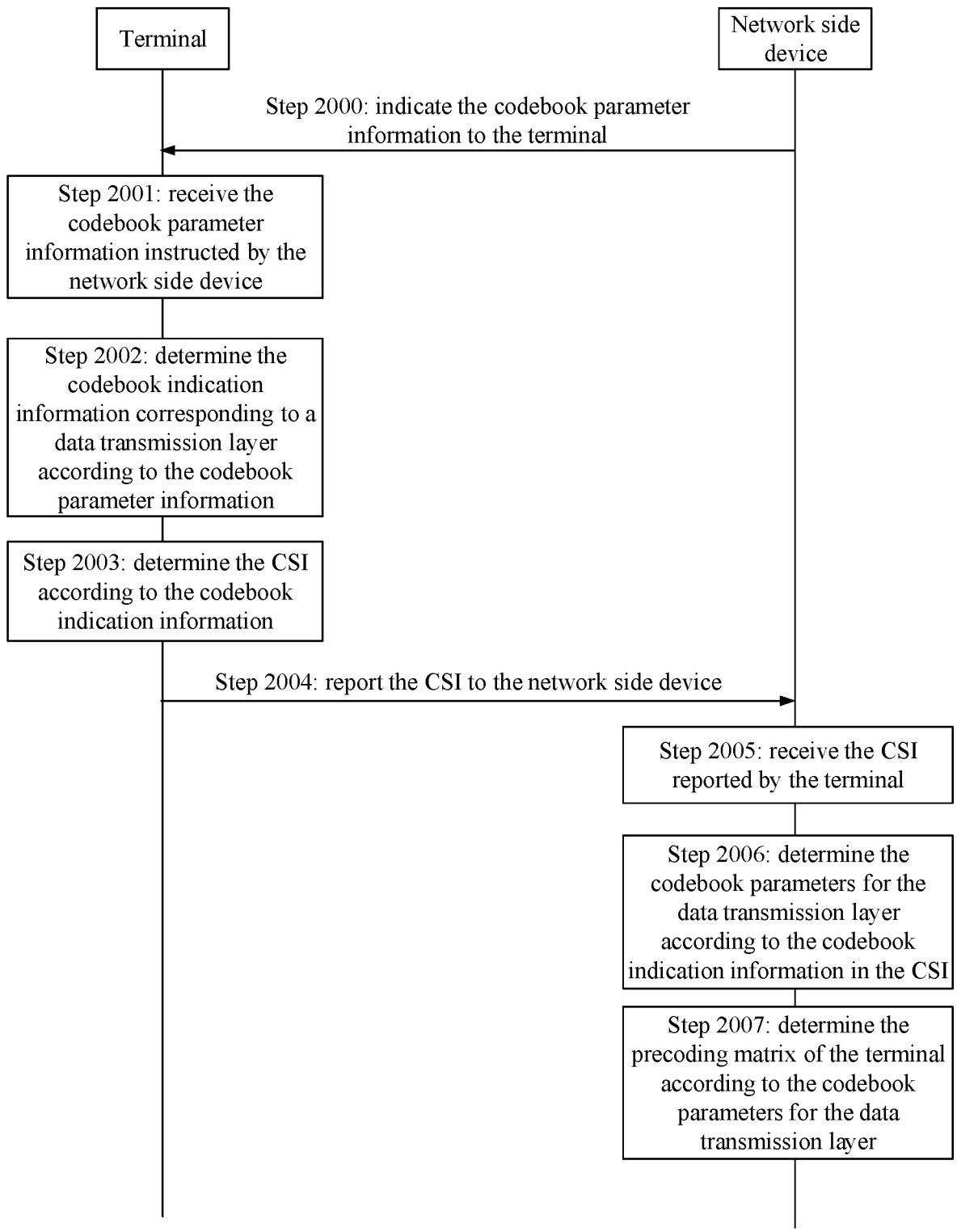
FIG. 20 is a flowchart of a complete method for reporting the channel state information provided by embodiments of the present application.

As shown in FIG. 20, it is a flowchart of a complete method for reporting channel state information provided by embodiments of the present application, which includes the following steps.

Step 2000: a network side device indicates the codebook parameter information to a terminal.

Step 2001: the terminal receives the codebook parameter information instructed by the network side device.

Step 2002: the terminal determines the codebook indication information corresponding to a data transmission layer according to the codebook parameter information.

Step 2003: the terminal determines the CSI according to the codebook indication information.

Step 2004: the terminal reports the CSI to the network side device.

Step 2005: the network side device receives the CSI reported by the terminal.

Step 2006: the network side device determines the codebook parameters for the data transmission layer according to the codebook indication information in the CSI.

Step 2007: the network side device determines the precoding matrix of the terminal according to the codebook parameters for the data transmission layer.

Based on the same inventive concept, an embodiment of the present application further provides a device for reporting channel state information. Since this device is the device in the method in the embodiments of the present application and the principle of this device to solve the problem is similar to that of the method, the implementations of this device can refer to the implementations of the method, and the repeated description thereof will be omitted here.

Figure 21:
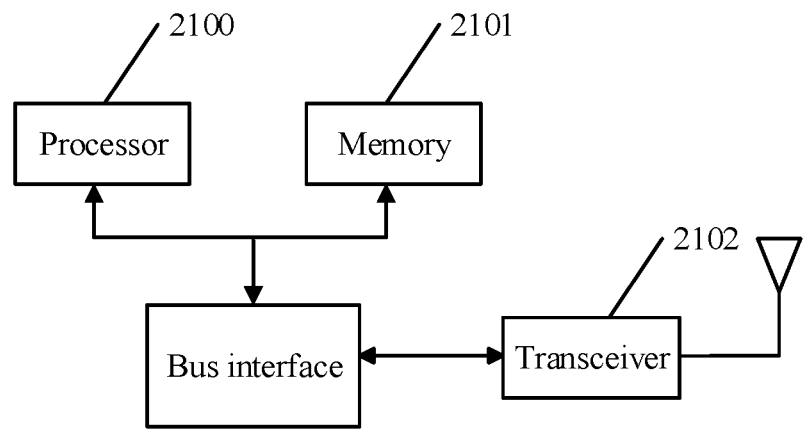
FIG. 21 is a structural schematic diagram of a terminal for reporting the channel state information provided by embodiments of the present application.

As shown in FIG. 21, a first network side device of an embodiment of the present application includes: a processor 2100, a memory 2101 and a transceiver 2102.

The processor 2100 is responsible for managing the bus architecture and general processing, and the memory 2101 may store the data used by the processor 2100 when performing the operations. The transceiver 2102 is configured to receive and send the data under the control of the processor 2100.

The bus architecture may include any numbers of interconnected buses and bridges, and link various circuits of one or more processors represented by the processor 2100 and the memory represented by the memory 2101. The bus architecture may further link various other circuits such as peripheral device, voltage regulator and power management circuit, which are all well known in the art and thus will not be further described again herein. The bus interface provides an interface. The processor 2100 is responsible for managing the bus architecture and general processing, and the memory 2101 may store the data used by the processor 2100 when performing the operations.

The procedure disclosed by the embodiment of the present application may be applied in the processor 2100 or implemented by the processor 2100. In the implementation process, each step of the signal processing flow may be completed by the integrated logic circuit of hardware in the processor 2100 or the instruction in the form of software. The processor 2100 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 2101, and the processor 2100 reads the information in the memory 2101 and completes the steps of the signal processing flow in combination with its hardware.

Here, the processor 2100 is configured to read a program in the memory 2101 and perform the process of:
determining the codebook indication information corresponding to a data transmission layer according to the codebook parameter information;
sending the CSI containing the codebook indication information to a network side device;
and the codebook indication information includes a part or all of following information:
the beam information for determining orthogonal beams in a precoding matrix, the base vector information for determining compression base vectors in the precoding matrix, and the non-zero coefficient indication information for determining compression coefficients in the precoding matrix.

In one embodiment, the codebook indication information includes the beam information for determining orthogonal beams in the precoding matrix;
the processor 2100 is further configured to:
if it is determined that multiple data transmission layers correspond to the same beam information, place the beam information corresponding to the multiple of data transmission layers in the CSI.

In one embodiment, the codebook indication information includes the base vector information for determining compression base vectors in the precoding matrix;
the processor 2100 is further configured to:
if it is determined that multiple data transmission layers correspond to the same base vector information, place the base vector information corresponding to the multiple of data transmission layers in the CSI.

In one embodiment, the codebook indication information includes the non-zero coefficient indication information for determining compression coefficients in the precoding matrix;
the processor 2100 is further configured to:
if it is determined that multiple data transmission layers correspond to the same non-zero coefficient indication information, place the non-zero coefficient indication information corresponding to the multiple of data transmission layers in the CSI.

In one embodiment, the codebook indication information includes the beam information for determining orthogonal beams in the precoding matrix, and the processor 2100 is configured to determine the beam information by:
taking a bitmap as the beam information corresponding to the data transmission layer, and bits in the bitmap correspond to candidate orthogonal beams, and a value of each bit indicates whether the data transmission layer uses an orthogonal beam corresponding to each bit; or taking an index set as the beam information corresponding to the data transmission layer, wherein the index set includes indexes of orthogonal beams for the data transmission layer; or taking the combination index information as the codebook indication information corresponding to the data transmission layer, and the combination index information has X bits, X is determined according to the quantity of candidate orthogonal beams and the quantity of orthogonal beams for the data transmission layer, and the combination index information indicates a position of combination of codebook parameters for the data transmission layer in all combinations of the candidate codebook parameters.

The codebook indication information includes the base vector information for determining compression base vectors in the precoding matrix, and the processor 2100 is further configured to determine the base vector information by:

taking a bitmap as the base vector information corresponding to the data transmission layer, and bits in the bitmap correspond to candidate compression base vectors, and a value on each bit indicates whether the data transmission layer uses a compression base vector corresponding to each bit; or taking an index set as the base vector information corresponding to the data transmission layer, and the index set includes indexes of compression base vectors for the data transmission layer; or taking the combination index information as the base vector information corresponding to the data transmission layer, and the combination index information has X bits, X is determined according to the quantity of candidate compression base vectors and the quantity of compression base vectors for the data transmission layer, and the combination index information indicates a position of combination of compression base vectors for the data transmission layer in all combinations of candidate compression base vectors.

The codebook indication information includes the non-zero coefficient indication information for determining compression coefficients in the precoding matrix, and the processor 2100 is further configured to determine the non-zero coefficient indication information by:

taking a bitmap as the non-zero coefficient indication information corresponding to the data transmission layer, and bits in the bitmap correspond to candidate non-zero coefficient positions, and a value on each bit indicates whether the data transmission layer uses a non-zero coefficient position corresponding to each bit; or taking an index set as the non-zero coefficient indication information corresponding to the data transmission layer, and the index set includes indexes of non-zero coefficient positions for the data transmission layer; or taking the combination index information as the non-zero coefficient indication information corresponding to the data transmission layer, and the combination index information has X bits, X is determined according to the quantity of candidate non-zero coefficient positions and the quantity of non-zero coefficient positions for the data transmission layer, and the combination index information indicates a position of combination of non-zero coefficient positions for the data transmission layer in all combinations of the candidate non-zero coefficient positions.

In one embodiment, if the codebook indication information includes the non-zero coefficient indication information for determining compression coefficients in the precoding matrix and the terminal places the non-zero coefficient position information in the non-zero coefficient indication information in a second part of the CSI, the processor 2100 is further configured to:

place the information on the quantity of non-zero coefficients in the non-zero coefficient indication information in a first part of the CSI.

In one embodiment, the processor 2100 is further configured to:

place all of the codebook indication information in a first part or a second part of the CSI; or place a part of the codebook indication information in a first part of the CSI, and a remaining part of the codebook indication information in a second part of the CSI.

Based on the same inventive concept, an embodiment of the present application further provides a device for reporting channel state information. Since this device is the device in the method in the embodiments of the present application and the principle of this device to solve the problem is similar to that of the method, the implementations of this device can refer to the implementations of the method, and the repeated description thereof will be omitted here.

Figure 22:
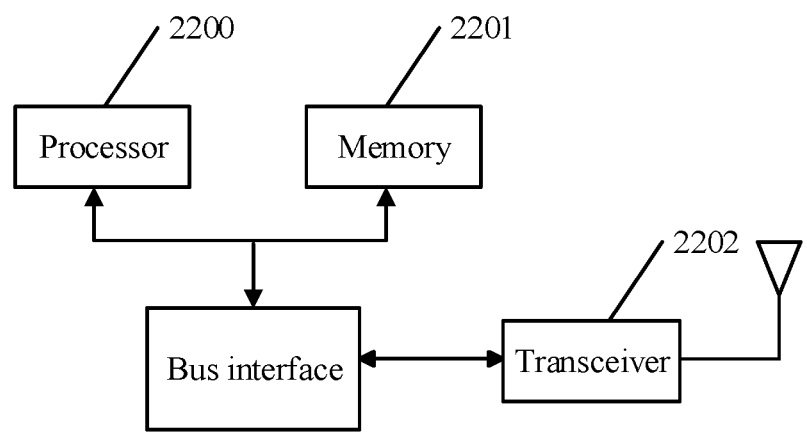
FIG. 22 is a structural schematic diagram of a network side device for reporting the channel state information provided by embodiments of the present application.

As shown in FIG. 22, a first terminal of an embodiment of the present application includes: a processor 2200, a memory 2201 and a transceiver 2202.

The processor 2200 is responsible for managing the bus architecture and general processing, and the memory 2201 may store the data used by the processor 2200 when performing the operations. The transceiver 2202 is configured to receive and send the data under the control of the processor 2200.

The bus architecture may include any numbers of interconnected buses and bridges, and link various circuits of one or more processors represented by the processor 2200 and the memory represented by the memory 2201. The bus architecture may further link various other circuits such as peripheral device, voltage regulator and power management circuit, which are all well known in the art and thus will not be further described again herein. The bus interface provides an interface. The processor 2200 is responsible for managing the bus architecture and general processing, and the memory 2201 may store the data used by the processor 2200 when performing the operations.

The procedure disclosed by the embodiment of the present application may be applied in the processor 2200 or implemented by the processor 2200. In the implementation process, each step of the signal processing flow may be completed by the integrated logic circuit of hardware in the processor 2200 or the instruction in the form of software. The processor 2200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 2201, and the processor 2200 reads the information in the memory 2201 and completes the steps of the signal processing flow in combination with its hardware.

Here, the processor 2200 is configured to read a program in the memory 2201 and perform the process of:

receiving the CSI containing the codebook indication information corresponding to a data transmission layer reported by a terminal;

determining a precoding matrix of the terminal after decoding the CSI according to the codebook indication information in the CSI;

and the codebook indication information includes a part or all of following information:

the beam information for determining orthogonal beams in the precoding matrix, the base vector information for determining compression base vectors in the precoding matrix, and the non-zero coefficient indication information for determining compression coefficients in the precoding matrix.

In one embodiment, the codebook indication information includes the beam information for determining orthogonal beams in the precoding matrix, and the processor 2200 is configured to:

determine orthogonal beams for multiple data transmission layers in candidate orthogonal beams according to beam information corresponding to the multiple of data transmission layers, if it is determined that the beam information in the CSI corresponds to the multiple of data transmission layers.

In one embodiment, the codebook indication information includes the base vector information for determining compression base vectors in the precoding matrix, and the processor 2200 is configured to:

determine compression base vectors for multiple data transmission layers in candidate compression base vectors according to base vector information corresponding to the multiple of data transmission layers, if it is determined that the base vector information in the CSI corresponds to the multiple of data transmission layers.

In one embodiment, the codebook indication information includes the non-zero coefficient indication information for determining compression coefficients in the precoding matrix, and the processor 2200 is configured to:

determine positions of non-zero coefficients in compression coefficients for multiple data transmission layers in candidate non-zero coefficient positions according to non-zero coefficient indication information corresponding to the multiple of data transmission layers, if it is determined that the non-zero coefficient indication information in the CSI corresponds to the multiple of data transmission layers.

In one embodiment, the codebook indication information includes the beam information for determining orthogonal beams in the precoding matrix, and the processor 2200 is configured to:

if the beam information is a bitmap, determine orthogonal beams for the data transmission layer according to bits in the bitmap and values on the bits, and the bits in the bitmap correspond to candidate orthogonal beams, and the a value of each bit indicates whether the data transmission layer uses an orthogonal beam corresponding to each bit; or if the beam information is an index set, determine orthogonal beams for the data transmission layer according to indexes in the index set, and the index set includes indexes of orthogonal beams for the data transmission layer; or if the beam information is the combination index information, determine a position of combination of orthogonal beams for the data transmission layer in all combinations of candidate orthogonal beams according to the combination index information and then the orthogonal beams for the data transmission layer according to the position, and the combination index information has X bits, X is determined according to the quantity of candidate orthogonal beams and the quantity of orthogonal beams for the data transmission layer, and the combination index information indicates the position of combination of orthogonal beams for the data transmission layer in all combinations of the candidate orthogonal beams.

The codebook indication information includes the base vector information for determining compression base vectors in the precoding matrix, and the processor 2200 is configured to:

if the base vector information is a bitmap, determine compression base vectors for the data transmission layer according to bits in the bitmap and values on the bits, and the bits in the bitmap correspond to candidate compression base vectors, and a value on each bit indicates whether the data transmission layer uses a compression base vector corresponding to each bit; or if the base vector information is an index set, determine compression base vectors for the data transmission layer according to indexes in the index set, and the index set includes indexes of compression base vectors for the data transmission layer; or if the base vector information is the combination index information, determine a position of combination of compression base vectors for the data transmission layer in all combinations of candidate compression base vectors according to the combination index information and then the compression base vectors for the data transmission layer according to the position, and the combination index information has X bits, X is determined according to the quantity of candidate compression base vectors and the quantity of compression base vectors for the data transmission layer, and the combination index information indicates the position of combination of compression base vectors for the data transmission layer in all combinations of candidate compression base vectors.

The codebook indication information includes the non-zero coefficient indication information for determining compression coefficients in the precoding matrix, and the processor 2200 is configured to:

if the non-zero coefficient indication information is a bitmap, determine non-zero coefficient positions for the data transmission layer according to bits in the bitmap and values on the bits, and the bits in the bitmap correspond to candidate non-zero coefficient positions, and a value on each bit indicates whether the data transmission layer uses a non-zero coefficient position corresponding to each bit; or if the non-zero coefficient indication information is an index set, determine non-zero coefficient positions for the data transmission layer according to indexes in the index set, and the index set includes indexes of non-zero coefficient positions for the data transmission layer; or if the non-zero coefficient indication information is the combination index information, determine a position of combination of non-zero coefficient positions for the data transmission layer in all combinations of candidate non-zero coefficient positions according to the combination index information and then the non-zero coefficient positions for the data transmission layer according to the position, and the combination index information has X bits, X is determined according to the quantity of candidate non-zero coefficient positions and the quantity of non-zero coefficient positions for the data transmission layer, and the combination index information indicates the position of combination of non-zero coefficient positions for the data transmission layer in all combinations of the candidate non-zero coefficient positions.

In one embodiment, the codebook indication information includes the non-zero coefficient indication information for determining compression coefficients in the precoding matrix, and the processor 2200 is configured to:

determine compression coefficients for the data transmission layer according to non-zero coefficient positions for the data transmission layer and a bit set corresponding to candidate non-zero coefficient positions, and the bit set includes the quantity of bits occupied by quantized amplitude coefficients of the candidate non-zero coefficient positions and the quantity of bits occupied by quantized phase coefficients of the candidate non-zero coefficient positions.

In one embodiment, if the codebook indication information includes the non-zero coefficient indication information for determining compression coefficients in the precoding matrix, and the position information in the non-zero coefficient indication information is located in a second part of the CSI;

the processor 2200 is further configured to:

determine the quantity of non-zero coefficients according to the information on the quantity of non-zero coefficients in a first part of the CSI or the configuration information of the network side device or the system pre-definition.

In one embodiment, the processor 2200 is further configured to:

determine all of the codebook indication information according to a first part or a second part of the CSI; or determine a part of the codebook indication information according to a first part of the CSI and a remaining part of the codebook indication information according to a second part of the CSI.

Based on the same inventive concept, an embodiment of the present application further provides a device for reporting channel state information. Since this device is the device in the method in the embodiments of the present application and the principle of this device to solve the problem is similar to that of the method, the implementations of this device can refer to the implementations of the method, and the repeated description thereof will be omitted here.

Figure 23:
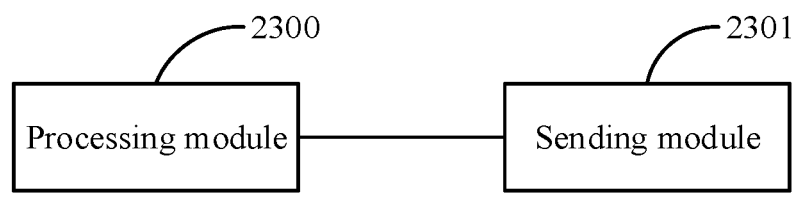
FIG. 23 is a structural schematic diagram of another terminal for reporting the channel state information provided by embodiments of the present application.

As shown in FIG. 23, an embodiment of the present application further provides a device for reporting channel state information, which includes a processing device 2300 and a sending device 2301:

the processing device 2300: determine the codebook indication information corresponding to a data transmission layer according to the codebook parameter information;

the sending device 2301: send the CSI containing the codebook indication information to a network side device;

and the codebook indication information includes a part or all of following information:

the beam information for determining orthogonal beams in a precoding matrix, the base vector information for determining compression base vectors in the precoding matrix, and the non-zero coefficient indication information for determining compression coefficients in the precoding matrix.

In one embodiment, the codebook indication information includes the beam information for determining orthogonal beams in the precoding matrix;

the processing device 2300 is further configured to:

if it is determined that multiple data transmission layers correspond to the same beam information, place the beam information corresponding to the multiple of data transmission layers in the CSI.

In one embodiment, the codebook indication information includes the base vector information for determining compression base vectors in the precoding matrix;

the processing device 2300 is further configured to:

if it is determined that multiple data transmission layers correspond to the same base vector information, place the base vector information corresponding to the multiple of data transmission layers in the CSI.

In one embodiment, the codebook indication information includes the non-zero coefficient indication information for determining compression coefficients in the precoding matrix;

the processing device 2300 is further configured to:

if it is determined that multiple data transmission layers correspond to the same non-zero coefficient indication information, place the non-zero coefficient indication information corresponding to the multiple of data transmission layers in the CSI.

In one embodiment, the codebook indication information includes the beam information for determining orthogonal beams in the precoding matrix, and the processing device 2300 is configured to determine the beam information by:

taking a bitmap as the beam information corresponding to the data transmission layer, and bits in the bitmap correspond to candidate orthogonal beams, and a value of each bit indicates whether the data transmission layer uses an orthogonal beam corresponding to each bit; or taking an index set as the beam information corresponding to the data transmission layer, and the index set includes indexes of orthogonal beams for the data transmission layer, or taking the combination index information as the codebook indication information corresponding to the data transmission layer, and the combination index information has X bits, X is determined according to the quantity of candidate orthogonal beams and the quantity of orthogonal beams for the data transmission layer, and the combination index information indicates a position of combination of codebook parameters for the data transmission layer in all combinations of the candidate codebook parameters.

The codebook indication information includes the base vector information for determining compression base vectors in the precoding matrix, and the processing device 2300 is further configured to determine the base vector information by:

taking a bitmap as the base vector information corresponding to the data transmission layer, and bits in the bitmap correspond to candidate compression base vectors, and a value on each bit indicates whether the data transmission layer uses a compression base vector corresponding to each bit; or taking an index set as the base vector information corresponding to the data transmission layer, and the index set includes indexes of compression base vectors for the data transmission layer, or taking the combination index information as the base vector information corresponding to the data transmission layer, and the combination index information has X bits, X is determined according to the quantity of candidate compression base vectors and the quantity of compression base vectors for the data transmission layer, and the combination index information indicates a position of combination of compression base vectors for the data transmission layer in all combinations of candidate compression base vectors.

The codebook indication information includes the non-zero coefficient indication information for determining compression coefficients in the precoding matrix, and the processing device 2300 is further configured to determine the non-zero coefficient indication information by:

taking a bitmap as the non-zero coefficient indication information corresponding to the data transmission layer, and bits in the bitmap correspond to candidate non-zero coefficient positions, and a value on each bit indicates whether the data transmission layer uses a non-zero coefficient position corresponding to each bit; or taking an index set as the non-zero coefficient indication information corresponding to the data transmission layer, and the index set includes indexes of non-zero coefficient positions for the data transmission layer; or taking the combination index information as the non-zero coefficient indication information corresponding to the data transmission layer, and the combination index information has X bits, X is determined according to the quantity of candidate non-zero coefficient positions and the quantity of non-zero coefficient positions for the data transmission layer, and the combination index information indicates a position of combination of non-zero coefficient positions for the data transmission layer in all combinations of candidate non-zero coefficient positions.

In one embodiment, if the codebook indication information includes the non-zero coefficient indication information for determining compression coefficients in the precoding matrix and the terminal places the non-zero coefficient position information in the non-zero coefficient indication information in a second part of the CSI, the processing device 2300 is further configured to:

place the information on the quantity of non-zero coefficients in the non-zero coefficient indication information in a first part of the CSI.

In one embodiment, the processing device 2300 is further configured to:

place all of the codebook indication information in a first part or a second part of the CSI; or place a part of the codebook indication information in a first part of the CSI, and a remaining part in a second part of the CSI.

Based on the same inventive concept, an embodiment of the present application further provides a device for reporting channel state information. Since this device is the device in the method in the embodiments of the present application and the principle of this device to solve the problem is similar to that of the method, the implementations of this device can refer to the implementations of the method, and the repeated description thereof will be omitted here.

Figure 24:
FIG. 24 is a structural schematic diagram of another network side device for reporting the channel state information provided by embodiments of the present application.

As shown in FIG. 24, an embodiment of the present application further provides a device for reporting channel state information, which includes a receiving device 2400 and a processing device 2401:

the receiving device 2400: receive the CSI containing the codebook indication information corresponding to a data transmission layer reported by a terminal;

the processing device 2401: determine a precoding matrix of the terminal after decoding the CSI according to the codebook indication information in the CSI;

and the codebook indication information includes a part or all of following information:

the beam information for determining orthogonal beams in the precoding matrix, the base vector information for determining compression base vectors in the precoding matrix, and the non-zero coefficient indication information for determining compression coefficients in the precoding matrix.

In one embodiment, the codebook indication information includes the beam information for determining orthogonal beams in the precoding matrix, and the processing device 2401 is configured to:

determine orthogonal beams for multiple data transmission layers in candidate orthogonal beams according to beam information corresponding to the multiple of data transmission layers, if it is determined that the beam information in the CSI corresponds to the multiple of data transmission layers.

In one embodiment, the codebook indication information includes the base vector information for determining compression base vectors in the precoding matrix, and the processing device 2401 is configured to:

determine compression base vectors for multiple data transmission layers in candidate compression base vectors according to base vector information corresponding to the multiple of data transmission layers, if it is determined that the base vector information in the CSI corresponds to the multiple of data transmission layers.

In one embodiment, the codebook indication information includes the non-zero coefficient indication information for determining compression coefficients in the precoding matrix, and the processing device 2401 is configured to:

determine positions of non-zero coefficients in compression coefficients for multiple data transmission layers in candidate non-zero coefficient positions according to non-zero coefficient indication information corresponding to the multiple of data transmission layers, if it is determined that the non-zero coefficient indication information in the CSI corresponds to the multiple of data transmission layers.

In one embodiment, the codebook indication information includes the beam information for determining orthogonal beams in the precoding matrix, and the processing device 2401 is configured to:

if the beam information is a bitmap, determine orthogonal beams for the data transmission layer according to bits in the bitmap and values on the bits, and the bits in the bitmap correspond to candidate orthogonal beams, and the a value of each bit indicates whether the data transmission layer uses an orthogonal beam corresponding to each bit; or if the beam information is an index set, determine orthogonal beams for the data transmission layer according to indexes in the index set, and the index set includes indexes of orthogonal beams for the data transmission layer; or if the beam information is the combination index information, determine a position of combination of orthogonal beams for the data transmission layer in all combinations of candidate orthogonal beams according to the combination index information and then the orthogonal beams for the data transmission layer according to the position, and the combination index information has X bits, X is determined according to the quantity of the candidate orthogonal beams and the quantity of orthogonal beams for the data transmission layer, and the combination index information indicates the position of combination of orthogonal beams for the data transmission layer in all combinations of candidate orthogonal beams.

The codebook indication information includes the base vector information for determining compression base vectors in the precoding matrix, and the processing device 2401 is configured to:

if the base vector information is a bitmap, determine compression base vectors for the data transmission layer according to bits in the bitmap and values on the bits, and the bits in the bitmap correspond to candidate compression base vectors, and a value on each bit indicates whether the data transmission layer uses a compression base vector corresponding to each bit; or if the base vector information is an index set, determine compression base vectors for the data transmission layer according to indexes in the index set, and the index set includes indexes of compression base vectors for the data transmission layer; or if the base vector information is the combination index information, determine a position of combination of compression base vectors for the data transmission layer in all combinations of the candidate compression base vectors according to the combination index information and then the compression base vectors for the data transmission layer according to the position, and the combination index information has X bits, X is determined according to the quantity of the candidate compression base vectors and the quantity of compression base vectors for the data transmission layer, and the combination index information indicates the position of combination of compression base vectors for the data transmission layer in all combinations of the candidate compression base vectors.

The codebook indication information includes the non-zero coefficient indication information for determining compression coefficients in the precoding matrix, and the processing device 2401 is configured to:

if the non-zero coefficient indication information is a bitmap, determine non-zero coefficient positions for the data transmission layer according to bits in the bitmap and values on the bits, and the bits in the bitmap correspond to candidate non-zero coefficient positions, and a value on each bit indicates whether the data transmission layer uses a non-zero coefficient position corresponding to each bit; or if the non-zero coefficient indication information is an index set, determine non-zero coefficient positions for the data transmission layer according to indexes in the index set, and the index set includes indexes of non-zero coefficient positions for the data transmission layer; or if the non-zero coefficient indication information is the combination index information, determine a position of combination of non-zero coefficient positions for the data transmission layer in all combinations of candidate non-zero coefficient positions according to the combination index information and then the non-zero coefficient positions for the data transmission layer according to the position, and the combination index information has X bits, X is determined according to the quantity of candidate non-zero coefficient positions and the quantity of non-zero coefficient positions for the data transmission layer, and the combination index information indicates the position of combination of non-zero coefficient positions for the data transmission layer in all combinations.

In one embodiment, the codebook indication information includes the non-zero coefficient indication information for determining compression coefficients in the precoding matrix, and the processing device 2401 is configured to:

determine compression coefficients for the data transmission layer according to non-zero coefficient positions for the data transmission layer and a bit set corresponding to candidate non-zero coefficient positions, and the bit set includes the quantity of bits occupied by quantized amplitude coefficients of the candidate non-zero coefficient positions and the quantity of bits occupied by quantized phase coefficients of the candidate non-zero coefficient positions.

In one embodiment, if the codebook indication information includes the non-zero coefficient indication information for determining compression coefficients in the precoding matrix, and the position information in the non-zero coefficient indication information is located in a second part of the CSI;

the processing device 2401 is further configured to:

determine the quantity of non-zero coefficients according to the information on the quantity of non-zero coefficients in a first part of the CSI or the configuration information of the network side device or the system pre-definition.

In one embodiment, the processing device 2401 is further configured to:

determine all of the codebook indication information according to a first part or a second part of the CSI; or determine a part of the codebook indication information according to a first part of the CSI and a remaining part of the codebook indication information according to a second part of the CSI.

An embodiment of the present application further provides a computer-readable non-volatile storage medium including program codes. When the program codes run on a computing device, the program codes are configured to cause the computing terminal to perform the steps of the method for reporting channel state information in the embodiments of the present application described above.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions.

These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

The invention claimed is:

1. A method for reporting channel state information, comprising:
   determining, by a terminal, codebook indication information corresponding to a data transmission layer according to codebook parameter information; wherein the codebook indication information comprises a part or all of following information:
   beam information for determining orthogonal beams in a precoding matrix, base vector information for determining compression base vectors in the precoding matrix, and non-zero coefficient indication information for determining compression coefficients in the precoding matrix;
   sending, by the terminal, Channel State Information, CSI, containing the codebook indication information to a network side device;
   wherein, the codebook indication information comprises the beam information for determining orthogonal beams in the precoding matrix, and the terminal determines the beam information by:
   taking, by the terminal, combination index information as the beam information corresponding to the data transmission layer, wherein the combination index information has X bits, X is determined according to a quantity of candidate orthogonal beams and a quantity of orthogonal beams for the data transmission layer, and the combination index information indicates a position of a combination of orthogonal beams for the data transmission layer in all combinations of the candidate orthogonal beams:
   the codebook indication information comprises the base vector information for determining compression base vectors in the precoding matrix, and the terminal determines the base vector information by:
   taking, by the terminal, combination index information as the base vector information corresponding to the data transmission layer, wherein the combination index information has X bits, X is determined according to a quantity of candidate compression base vectors and a quantity of compression base vectors for the data transmission layer, and the combination index information indicates a position of a combination of compression base vectors for the data transmission layer in all combinations of the candidate compression base vectors;
   the codebook indication information comprises the non-zero coefficient indication information for determining compression coefficients in the precoding matrix, and the terminal determines the non-zero coefficient indication information by:
   taking, by the terminal, a bitmap as the non-zero coefficient indication information corresponding to the data transmission layer, wherein bits in the bitmap correspond to candidate non-zero coefficient positions, and a value on each bit indicates whether the data transmission layer uses a non-zero coefficient position corresponding to each bit.

2. The method of claim 1, wherein, the codebook indication information comprises the non-zero coefficient indication information for determining compression coefficients in the precoding matrix, and the terminal places non-zero coefficient position information in the non-zero coefficient indication information in a second part of the CSI;
   the method comprises:
   placing, by the terminal, information on a quantity of non-zero coefficients in the non-zero coefficient indication information in a first part of the CSI.

3. The method of claim 1, wherein, after determining, by the terminal, the codebook indication information corresponding to the data transmission layer according to the codebook parameter information, and before sending the CSI containing the codebook indication information to the network side device, the method comprises:
   placing, by the terminal, all of the codebook indication information in a first part or a second part of the CSI; or
   placing, by the terminal, a part of the codebook indication information in a first part of the CSI, and a remaining part of the codebook indication information in a second part of the CSI.

4. The method of claim 1, wherein, the codebook indication information comprises the beam information for determining orthogonal beams in the precoding matrix;
   after determining, by the terminal, the codebook indication information corresponding to the data transmission layer according to the codebook parameter information, and before sending the CSI containing the codebook indication information to the network side device, the method comprises:
   placing, by the terminal, beam information corresponding to a multiple data transmission layers in the CSI, if the terminal determines that the multiple data transmission layers correspond to same beam information.

5. A method for receiving channel state information, comprising:
   receiving, by a network side device, CSI containing codebook indication information corresponding to a data transmission layer reported by a terminal; wherein the codebook indication information comprises a part or all of following information: beam information for determining orthogonal beams in a precoding matrix, base vector information for determining compression base vectors in the precoding matrix, and non-zero coefficient indication information for determining compression coefficients in the precoding matrix;
   determining, by the network side device, a precoding matrix of the terminal after decoding the CSI according to the codebook indication information in the CSI;

wherein, the codebook indication information comprises the beam information for determining orthogonal beams in the precoding matrix; and the decoding by the network side device, the CSI according to the codebook indication information in the CSI, comprises:
if the beam information is combination index information, determining, by the network side device, a position of a combination of orthogonal beams for the data transmission layer in all combinations of candidate orthogonal beams according to the combination index information and then the orthogonal beams for the data transmission layer according to the position, wherein the combination index information has X bits, X is determined according to a quantity of the candidate orthogonal beams and a quantity of the orthogonal beams for the data transmission layer, and the combination index information indicates the position of combination of orthogonal beams for the data transmission layer in all combinations of the candidate orthogonal beams:
the codebook indication information comprises the base vector information for determining compression base vectors in the precoding matrix; and decoding, by the network side device, the CSI according to the codebook indication information in the CSI, comprises:
if the base vector information is combination index information, determining, by the network side device, a position of combination of compression base vectors for the data transmission layer in all combinations of candidate compression base vectors according to the combination index information and then the compression base vectors for the data transmission layer according to the position, wherein the combination index information has X bits, X is determined according to a quantity of the candidate compression base vectors and a quantity of compression base vectors for the data transmission layer, and the combination index information indicates the position of combination of compression base vectors for the data transmission layer in all combinations the candidate compression base vectors:
the codebook indication information comprises the non-zero coefficient indication information for determining compression coefficients in the precoding matrix; and decoding, by the network side device, the CSI according to the codebook indication information in the CSI, comprises:
if the non-zero coefficient indication information is a bitmap, determining, by the network side device, non-zero coefficient positions for the data transmission layer according to bits in the bitmap and values on the bits, wherein the bits in the bitmap correspond to candidate non-zero coefficient positions, and a value on each bit indicates whether the data transmission layer uses a non-zero coefficient position corresponding to each bit.

6. The method of claim 5, wherein, the codebook indication information comprises the non-zero coefficient indication information for determining compression coefficients in the precoding matrix; and the determining, by the network side device, the precoding matrix of the terminal after decoding the CSI according to the codebook indication information in the CSI, comprises:
determining, by the network side device, compression coefficients for the data transmission layer according to non-zero coefficient positions for the data transmission layer and a bit set corresponding to candidate non-zero coefficient positions, wherein the bit set comprises a quantity of bits occupied by quantized amplitude coefficients of the candidate non-zero coefficient positions and a quantity of bits occupied by quantized phase coefficients of the candidate non-zero coefficient positions.

7. The method of claim 5, wherein, the codebook indication information comprises the non-zero coefficient indication information for determining compression coefficients in the precoding matrix, and position information in the non-zero coefficient indication information is located in a second part of the CSI;
the method comprises:
determining, by the network side device, a quantity of non-zero coefficients according to information on the quantity of non-zero coefficients in a first part of the CSI or configuration information of the network side device or system pre-definition.

8. The method of claim 5, wherein, after the network side device receives the CSI containing the codebook indication information corresponding to the data transmission layer reported by the terminal, and before the network side device determines the precoding matrix of the terminal after decoding the CSI according to the codebook indication information in the CSI, the method comprises:
determining, by the network side device, all of the codebook indication information according to a first part or a second part of the CSI; or
determining, by the network side device, a part of the codebook indication information according to a first part of the CSI and a remaining part of the codebook indication information according to a second part of the CSI.

9. A device for receiving channel state information, comprising:
a processor and a memory;
wherein the processor is configured to read a program in the memory and perform the process of the method according to claim 5.

10. The method of claim 5, wherein, the codebook indication information comprises the beam information for determining orthogonal beams in the precoding matrix; and the decoding, by the network side device, the CSI according to the codebook indication information in the CSI, comprises:
determining, by the network side device, orthogonal beams for multiple data transmission layers in candidate orthogonal beams according to beam information corresponding to the multiple of data transmission layers, if the network side device determines that the beam information in the CSI corresponds to the multiple of data transmission layers.

11. A device for reporting channel state information, comprising: a processor and a memory;
wherein the processor is configured to read a program in the memory and perform the process of:
determining codebook indication information corresponding to a data transmission layer according to codebook parameter information; wherein the codebook indication information comprises a part or all of following information: beam information for determining orthogonal beams in a precoding matrix, base vector information for determining compression base vectors in the precoding matrix, and non-zero coefficient indication information for determining compression coefficients in the precoding matrix;

sending Channel State Information, CSI, containing the codebook indication information to a network side device;

wherein, the codebook indication information comprises the beam information for determining orthogonal beams in the precoding matrix, and the processor is configured to determine the beam information by:

taking combination index information as the codebook indication information corresponding to the data transmission layer, wherein the combination index information has X bits, X is determined according to a quantity of candidate orthogonal beams and a quantity of orthogonal beams for the data transmission layer, and the combination index information indicates a position of combination of orthogonal beams for the data transmission layer in all combinations of the candidate orthogonal beams:

the codebook indication information comprises the base vector information for determining compression base vectors in the precoding matrix, and the processor is configured to determine the base vector information by:

taking combination index information as the base vector information corresponding to the data transmission layer, wherein the combination index information has X bits, X is determined according to a quantity of candidate compression base vectors and a quantity of compression base vectors for the data transmission layer, and the combination index information indicates a position of combination of compression base vectors for the data transmission layer in all combinations of the candidate compression base vectors;

the codebook indication information comprises the non-zero coefficient indication information for determining compression coefficients in the precoding matrix, and the processor is configured to determine the non-zero coefficient indication information by:

taking a bitmap as the non-zero coefficient indication information corresponding to the data transmission layer, wherein bits in the bitmap correspond to candidate non-zero coefficient positions, and a value on each bit indicates whether the data transmission layer uses a non-zero coefficient position corresponding to each bit.

12. The device of claim 11, wherein, if the codebook indication information comprises the non-zero coefficient indication information for determining compression coefficients in the precoding matrix, and the terminal places non-zero coefficient position information in the non-zero coefficient indication information in a second part of the CSI;

the processor is configured to:

place information on a quantity of non-zero coefficients in the non-zero coefficient indication information in a first part of the CSI.

13. The device of claim 11, wherein, the codebook indication information comprises the beam information for determining orthogonal beams in the precoding matrix;

the processor is configured to:

if it is determined that multiple data transmission layers correspond to same beam information, place the beam information corresponding to the multiple of data transmission layers in the CSI.

\* \* \* \* \*